(12) United States Patent
Bernat et al.

(10) Patent No.: US 11,044,099 B2
(45) Date of Patent: Jun. 22, 2021

(54) TECHNOLOGIES FOR PROVIDING CERTIFIED TELEMETRY DATA INDICATIVE OF RESOURCES UTILIZATIONS

(71) Applicant: Intel Corporation, Santa Clara, CA (US)

(72) Inventors: Francesc Guim Bernat, Barcelona (ES); Johan Van De Groenendaal, Portland, OR (US); Kshitij A. Doshi, Tempe, AZ (US); Susanne M. Balle, Hudson, NH (US); Suraj Prabhakaran, Aachen (DE)

(73) Assignee: Intel Corporation, Santa Clara, CA (US)

( * ) Notice: Subject to any disclaimer, the term of this patent is extended or adjusted under 35 U.S.C. 154(b) by 356 days.

(21) Appl. No.: 16/234,724

(22) Filed: Dec. 28, 2018

(65) Prior Publication Data

US 2019/0140838 A1 May 9, 2019

(51) Int. Cl.
*H04L 9/32* (2006.01)
*H04L 9/08* (2006.01)

(52) U.S. Cl.
CPC ............ *H04L 9/3247* (2013.01); *H04L 9/088* (2013.01)

(58) Field of Classification Search
CPC ..... H04L 9/3247; H04L 9/088; H04L 9/0822; H04L 9/0861; H04L 9/0897; G06F 9/5044; G06F 11/0709; G06F 13/1615; G06F 13/1621; G06F 13/1652; G06F 13/1668; G06F 13/4027; G06F 9/3851; G06F 9/505; G06F 9/4881; G06F 9/50; G06F 9/5005; G06F 9/5083; G06F 11/3409; G06F 11/3017; G06F 21/76; G06F 21/602; G06F 21/6218
USPC ......................................................... 713/176
See application file for complete search history.

(56) References Cited

U.S. PATENT DOCUMENTS

| | | | | |
|---|---|---|---|---|
| 7,149,898 | B2* | 12/2006 | Marejka .............. | H04L 63/0807 713/176 |
| 8,844,040 | B2* | 9/2014 | Harris ................. | H04L 63/0884 726/25 |
| 10,075,454 | B1* | 9/2018 | Parikh ................. | H04L 63/1408 |
| 10,120,714 | B1* | 11/2018 | Cabrera ................. | G06F 9/505 |
| 2003/0097335 | A1* | 5/2003 | Moskowitz ............ | G07C 5/008 705/52 |
| 2006/0059368 | A1* | 3/2006 | Fayad ..................... | G06F 21/87 713/189 |
| 2006/0059475 | A1* | 3/2006 | Augusteijn .......... | G06F 9/30098 717/155 |

(Continued)

FOREIGN PATENT DOCUMENTS

| CN | 102664729 B | * 12/2014 |
|---|---|---|
| CN | 104778148 A | * 7/2015 |

*Primary Examiner* — Shahriar Zarrineh
(74) *Attorney, Agent, or Firm* — Compass IP Law PC

(57) ABSTRACT

Technologies for providing certified telemetry data indicative of resource utilizations include a device with circuitry configured to obtain telemetry data indicative of a utilization of one or more device resources over a time period. The circuitry is additionally configured to sign the obtained telemetry data with a private key associated with the present device. Further, the circuitry is configured to send the signed telemetry data to a telemetry service for analysis.

18 Claims, 20 Drawing Sheets

(56) References Cited

U.S. PATENT DOCUMENTS

| | | | |
|---|---|---|---|
| 2006/0149883 A1* | 7/2006 | Benbow | G06F 1/186 710/305 |
| 2007/0213851 A1* | 9/2007 | Bellas | G06F 8/433 700/34 |
| 2009/0213127 A1* | 8/2009 | Krishnamurthy | G06F 9/5061 345/503 |
| 2011/0296440 A1* | 12/2011 | Launch | G06F 21/72 719/326 |
| 2013/0091345 A1* | 4/2013 | Shroff | G06F 21/00 713/2 |
| 2013/0204997 A1* | 8/2013 | Eggleston | H04L 43/0882 709/223 |
| 2015/0244851 A1* | 8/2015 | Miller | H04L 67/04 455/419 |
| 2016/0043869 A1* | 2/2016 | Smith | H04L 9/30 713/176 |
| 2016/0127128 A1* | 5/2016 | Chen | H04L 9/0866 713/189 |
| 2016/0179640 A1* | 6/2016 | Murata | G06F 11/2015 714/14 |
| 2016/0335120 A1* | 11/2016 | Gupta | G06F 9/547 |
| 2017/0109801 A1* | 4/2017 | Devendra | H04L 9/3247 |
| 2017/0132419 A1* | 5/2017 | Gupta | G06F 11/3604 |
| 2017/0351964 A1* | 12/2017 | Gross | G06F 13/37 |
| 2017/0353367 A1* | 12/2017 | Slaight | H04L 43/08 |
| 2018/0150644 A1* | 5/2018 | Khanna | G06F 3/065 |
| 2018/0260257 A1* | 9/2018 | Okada | G06F 9/468 |
| 2018/0365424 A1* | 12/2018 | Callaghan | G06F 21/575 |
| 2019/0065284 A1* | 2/2019 | Sardino | G06F 9/5027 |
| 2019/0114533 A1* | 4/2019 | Ng | G06N 3/04 |
| 2020/0057740 A1* | 2/2020 | Ge | G06F 11/2294 |
| 2020/0073677 A1* | 3/2020 | Chikin | G06F 9/44542 |
| 2020/0104180 A1* | 4/2020 | Banerjee | G06F 9/4881 |
| 2020/0137084 A1* | 4/2020 | Roy | H04L 63/1416 |

* cited by examiner

TECHNOLOGIES FOR PROVIDING CERTIFIED TELEMETRY DATA INDICATIVE OF RESOURCES UTILIZATIONS

BACKGROUND

Edge computing is an emerging paradigm in which compute operations are performed in a communication provider's infrastructure or in a service operator's infrastructure (e.g., closer to cellular base stations, network routers, and compute devices producing the data to be operated on). Unlike backend data warehouses and datacenters, edge clouds (e.g., collections of compute devices that cooperate to perform compute operations) are not physically concentrated at a few hubs, but are more likely to be interconnected ensembles of machines, networks, and services that are dotted across many cellular base stations, central offices, and/or other locations. For elastic and low latency delivery of edge services (e.g., delivery of results of compute operations to the compute devices requesting the results), a relatively high degree of coordination over resource prioritizations should exist among the various providers of infrastructure, communications, and application services at the edge, and the coordination should be achieved real-time. Pre-arranged and paid-for claims that different owners, operators, and service providers may have over the use of various pooled resources (e.g., under service level agreements) can vary dramatically and present challenges for multiple entities that own, operate, or consume these aggregated capabilities to work together efficiently.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
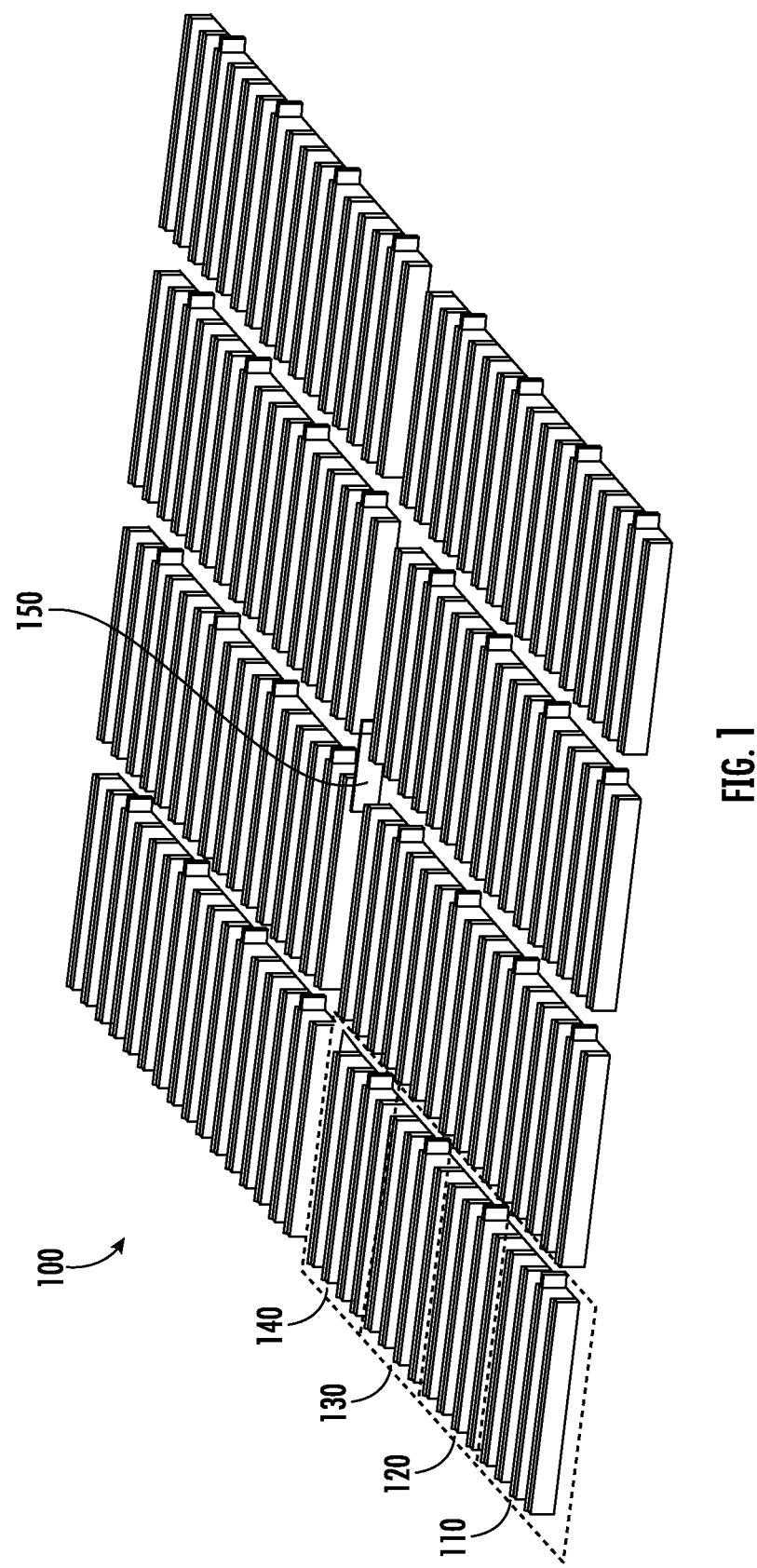
FIG. 1 is a simplified diagram of at least one embodiment of a data center for executing workloads with disaggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), i.e., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider megadata centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
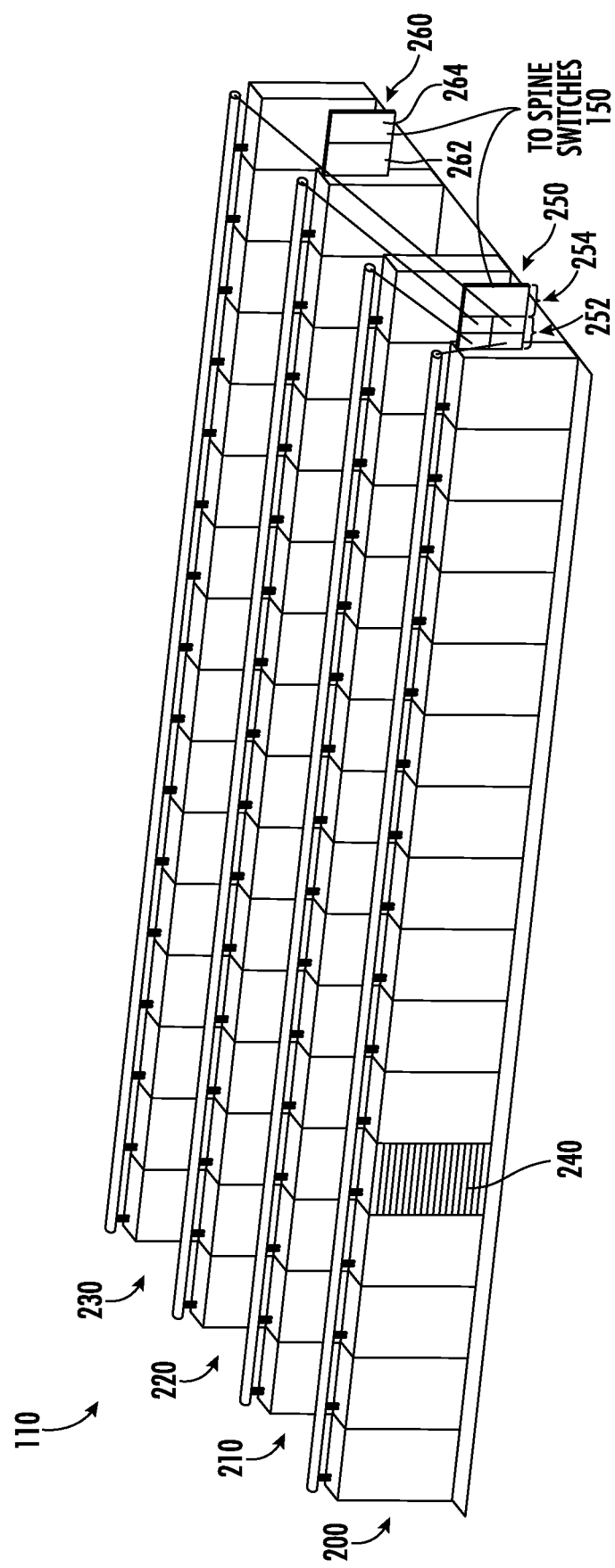
FIG. 2 is a simplified diagram of at least one embodiment of a pod that may be included in the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Intel's Omni-Path Architecture's, InfiniBand, PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, i.e., the racks are equidistant from a center switch.

Figure 3:
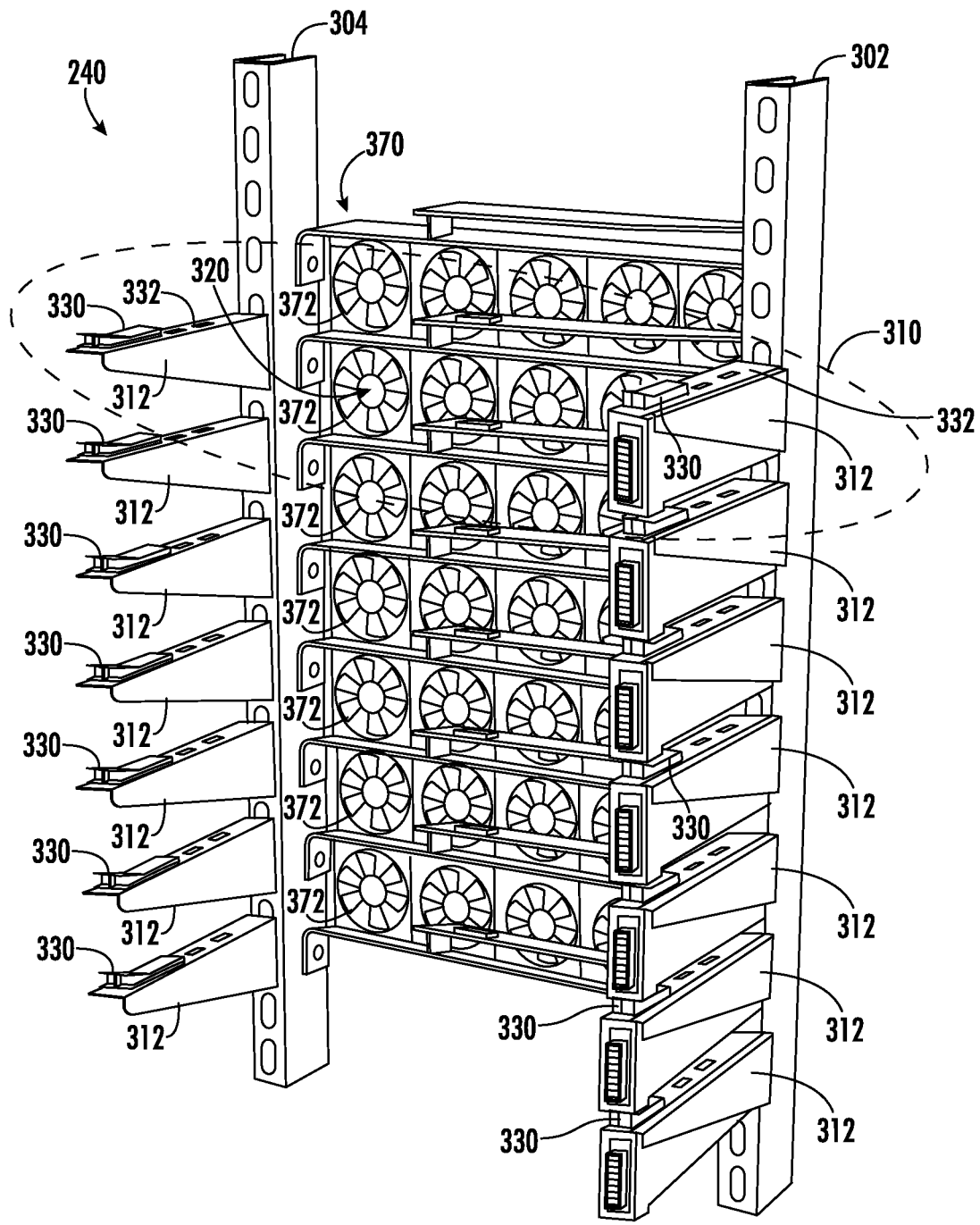
FIG. 3 is a perspective view of at least one embodiment of a rack that may be included in the pod of FIG. 2.
Figure 4:
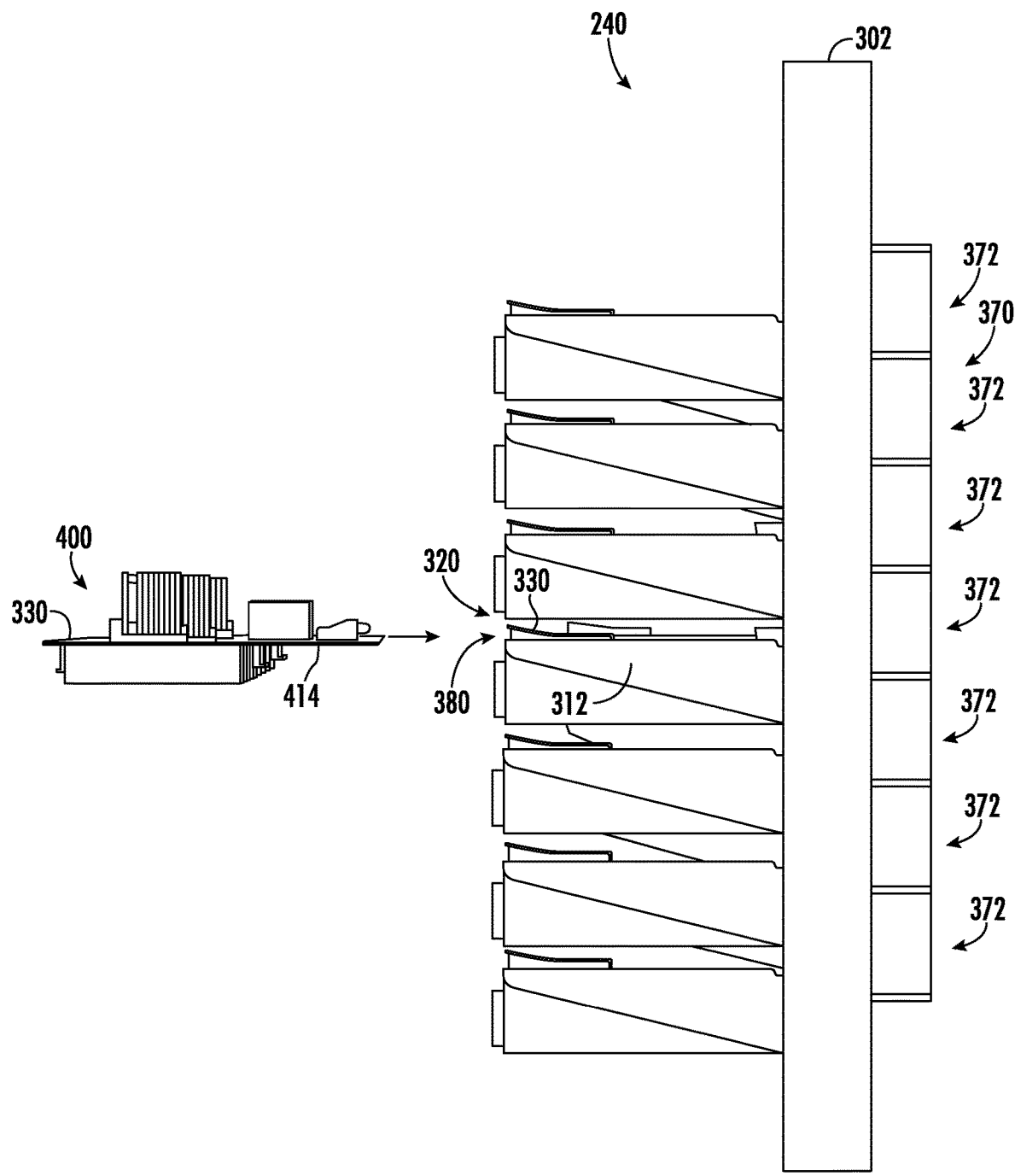
FIG. 4 is a side elevation view of the rack of FIG. 3.
Figure 5:
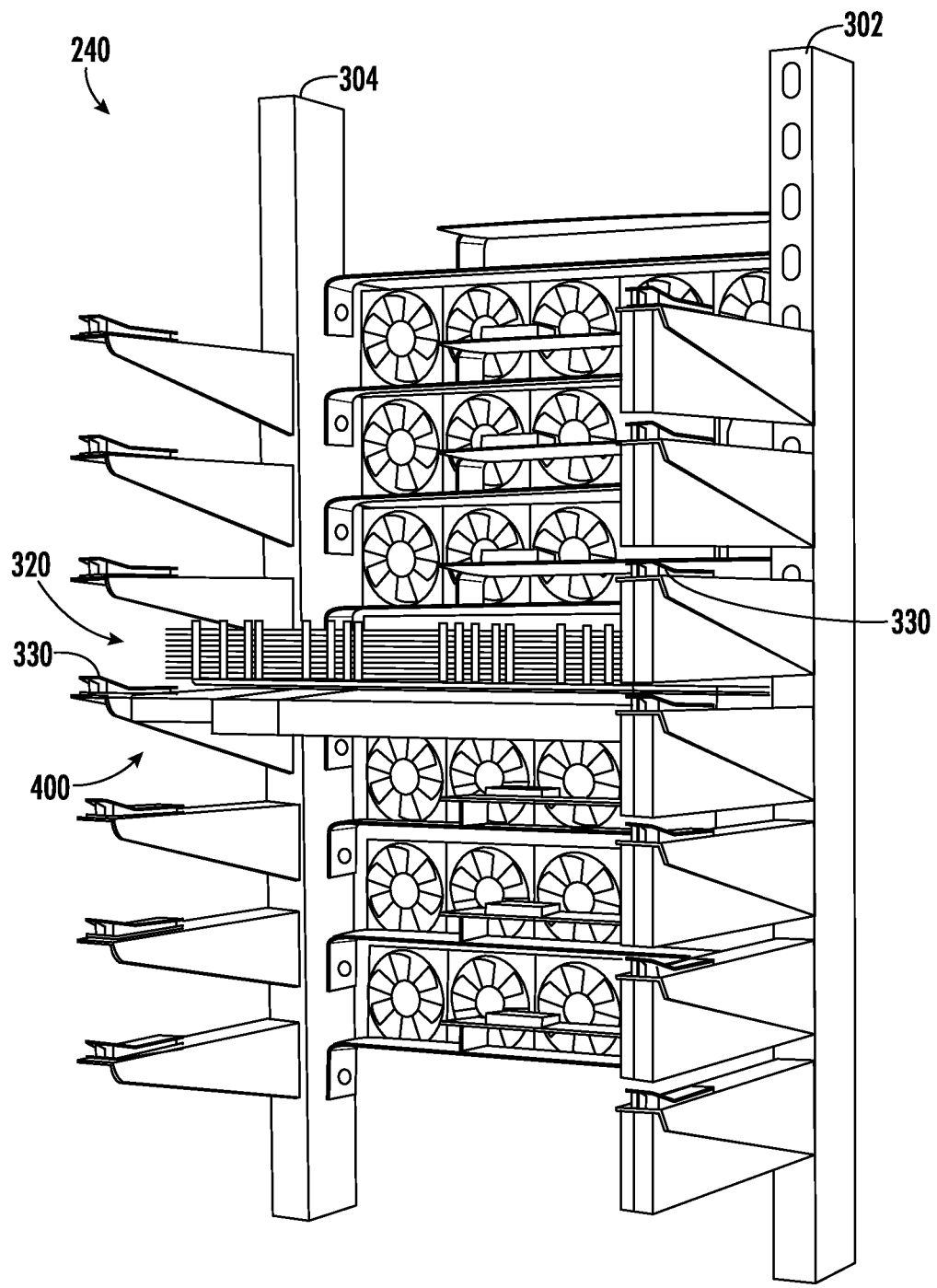
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
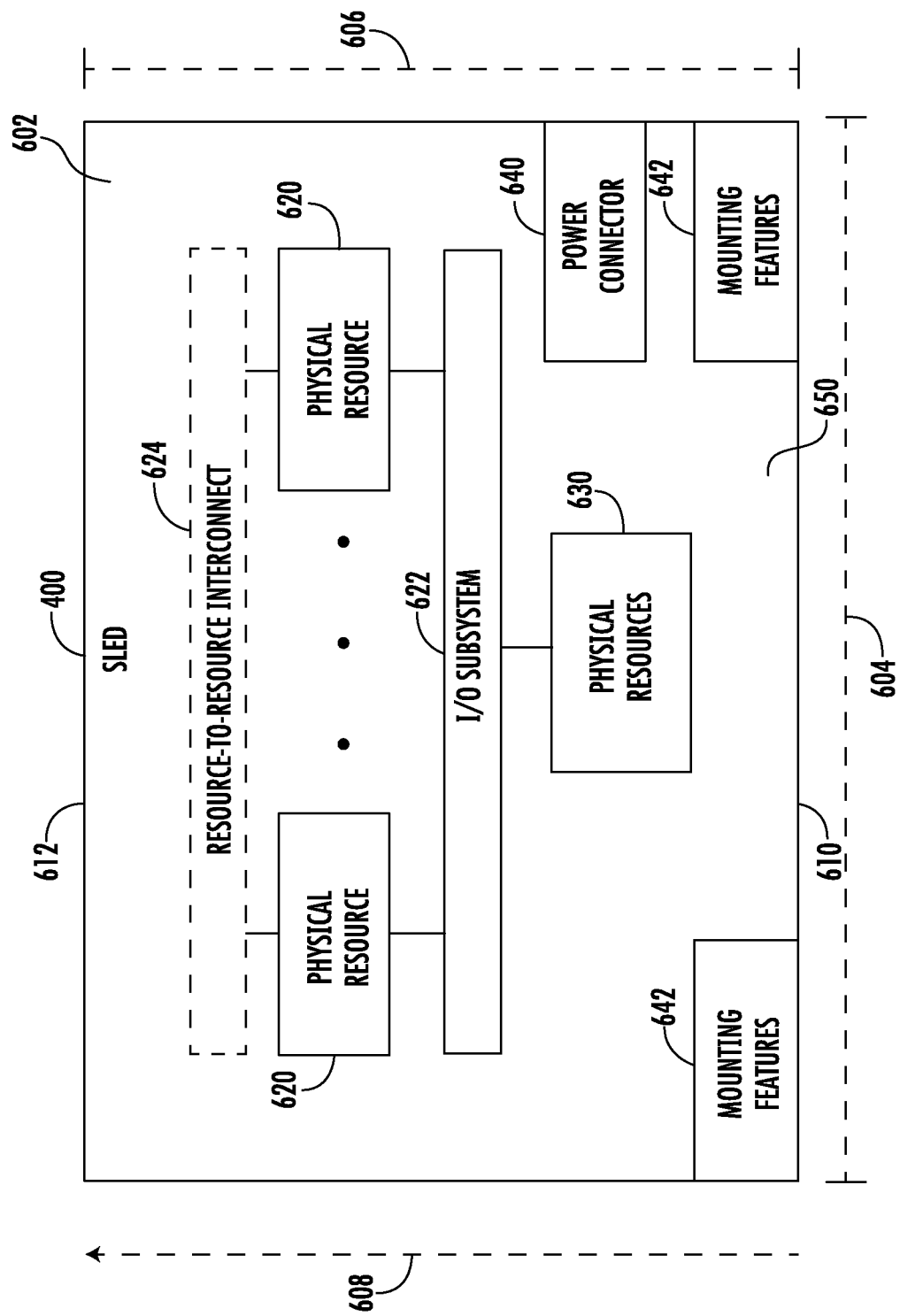
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In some embodiments, the I/O subsystem 622 is embodied as, or otherwise includes, a double data rate 4 (DDR4) data bus, a DDR5 data bus, and/or a non-volatile memory express (NVMe) bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
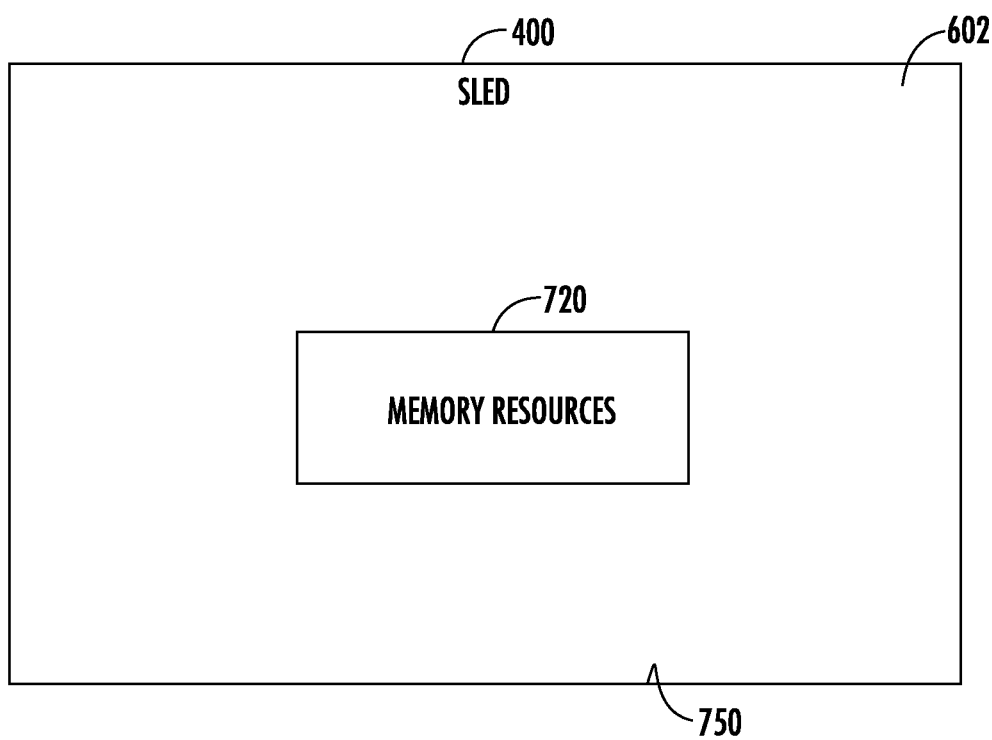
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include next-generation nonvolatile devices, such as Intel 3D XPoint™ memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
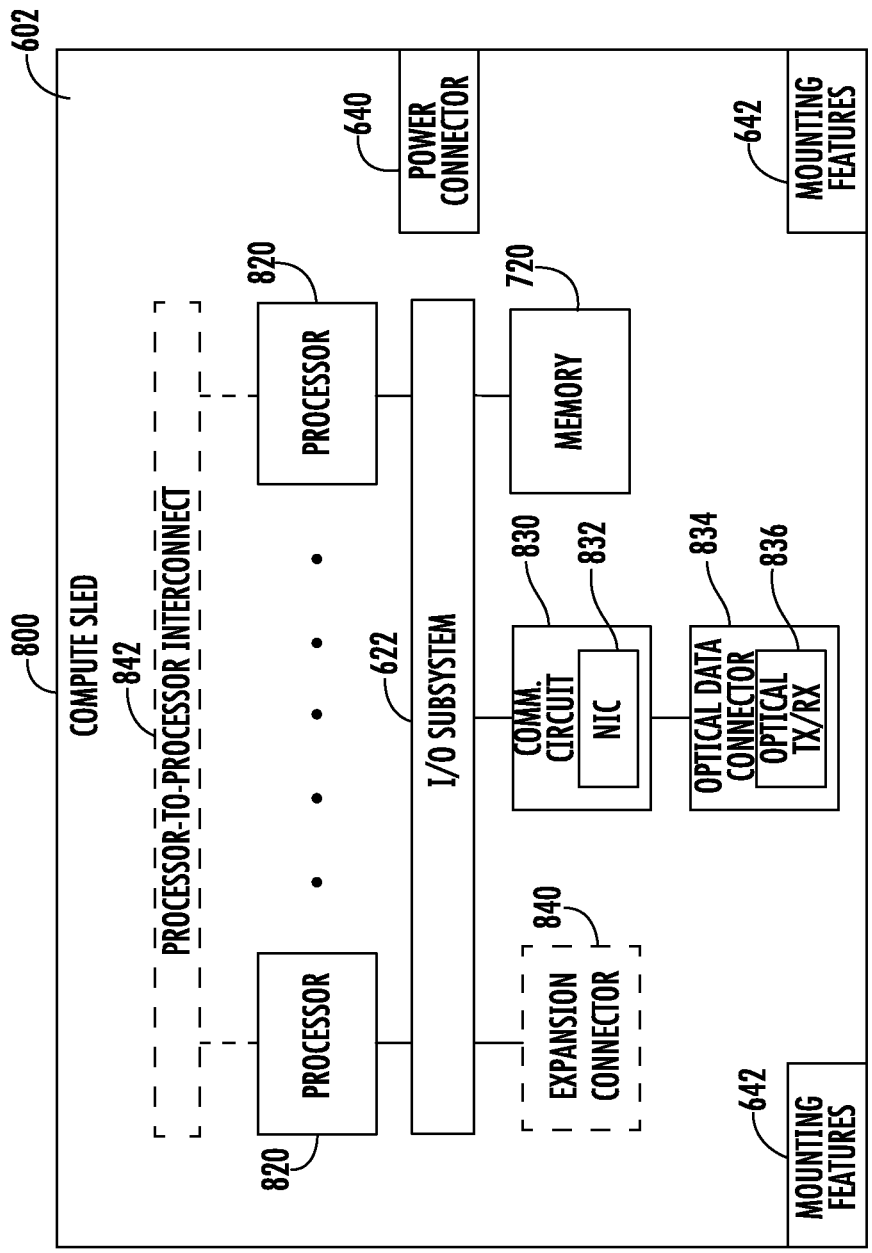
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
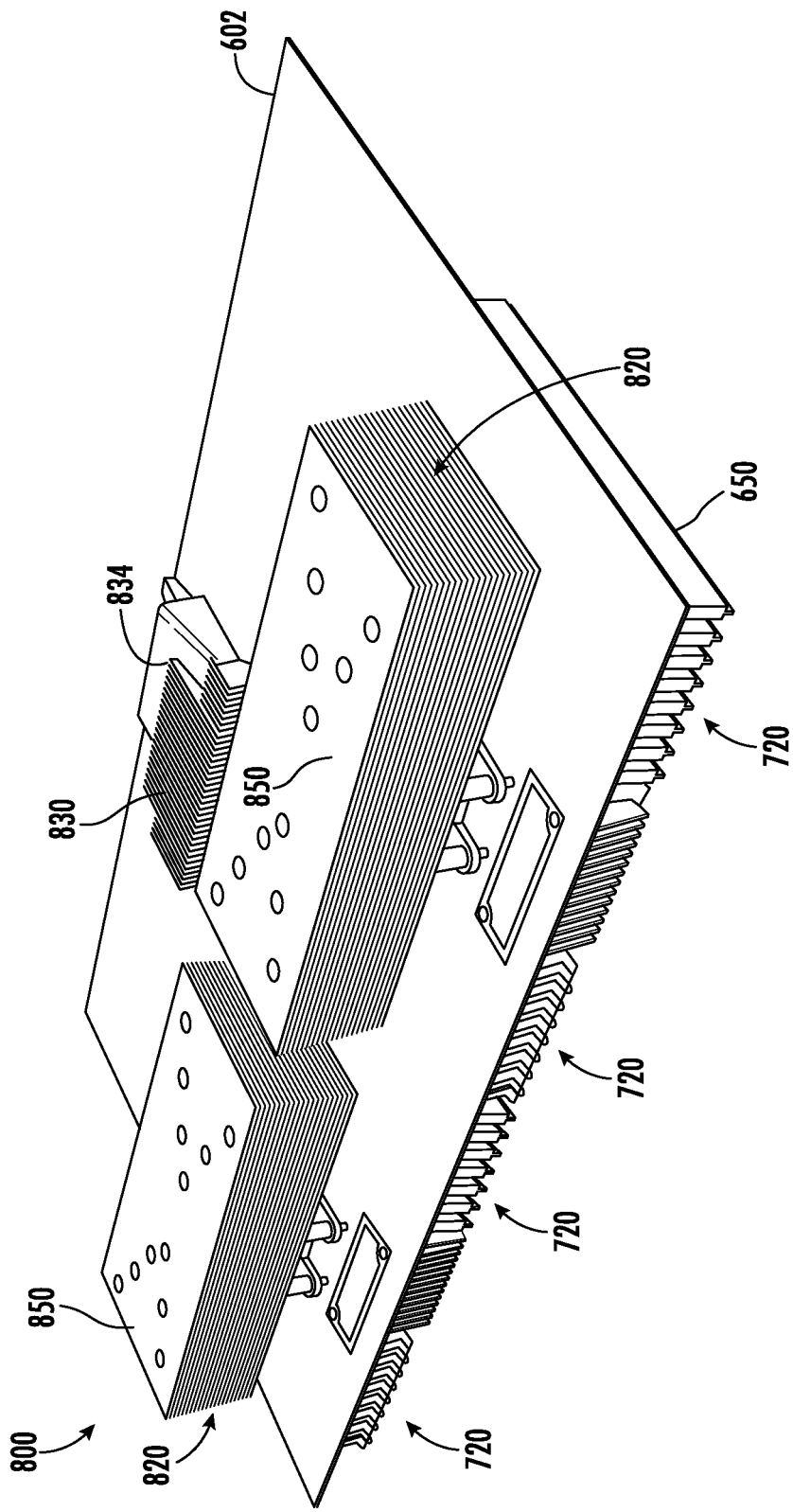
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
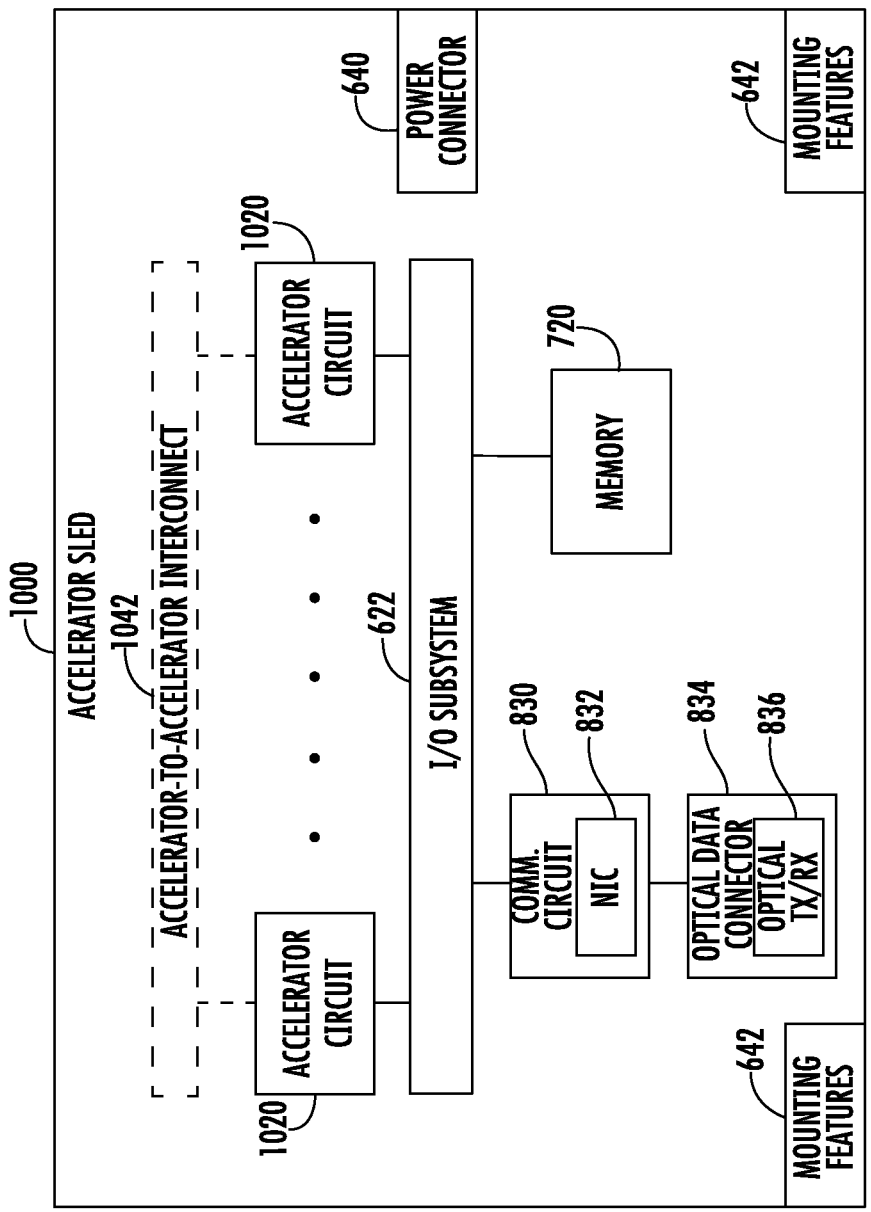
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
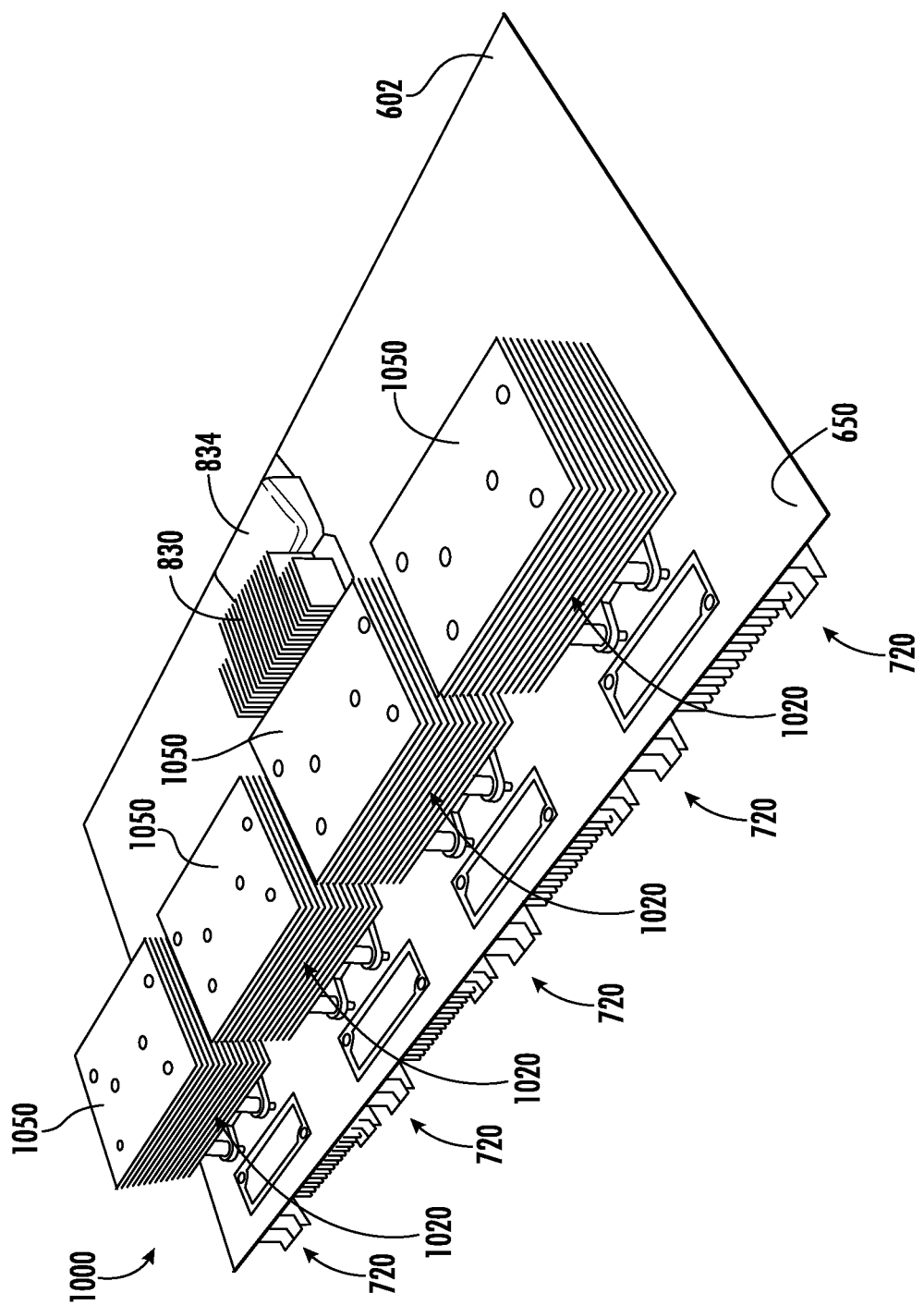
FIG. 11 is a top perspective view of at least one embodiment of the accelerator sled of FIG. 10.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
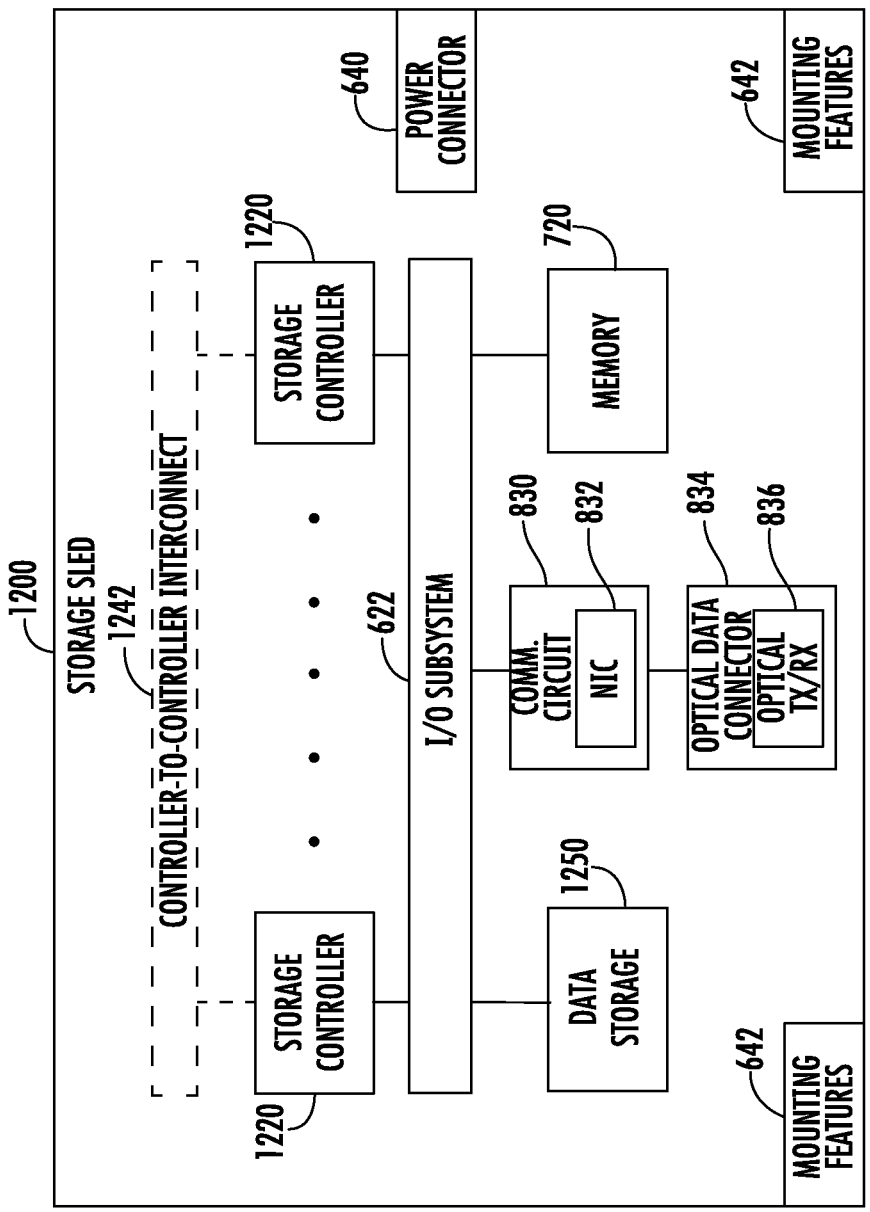
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
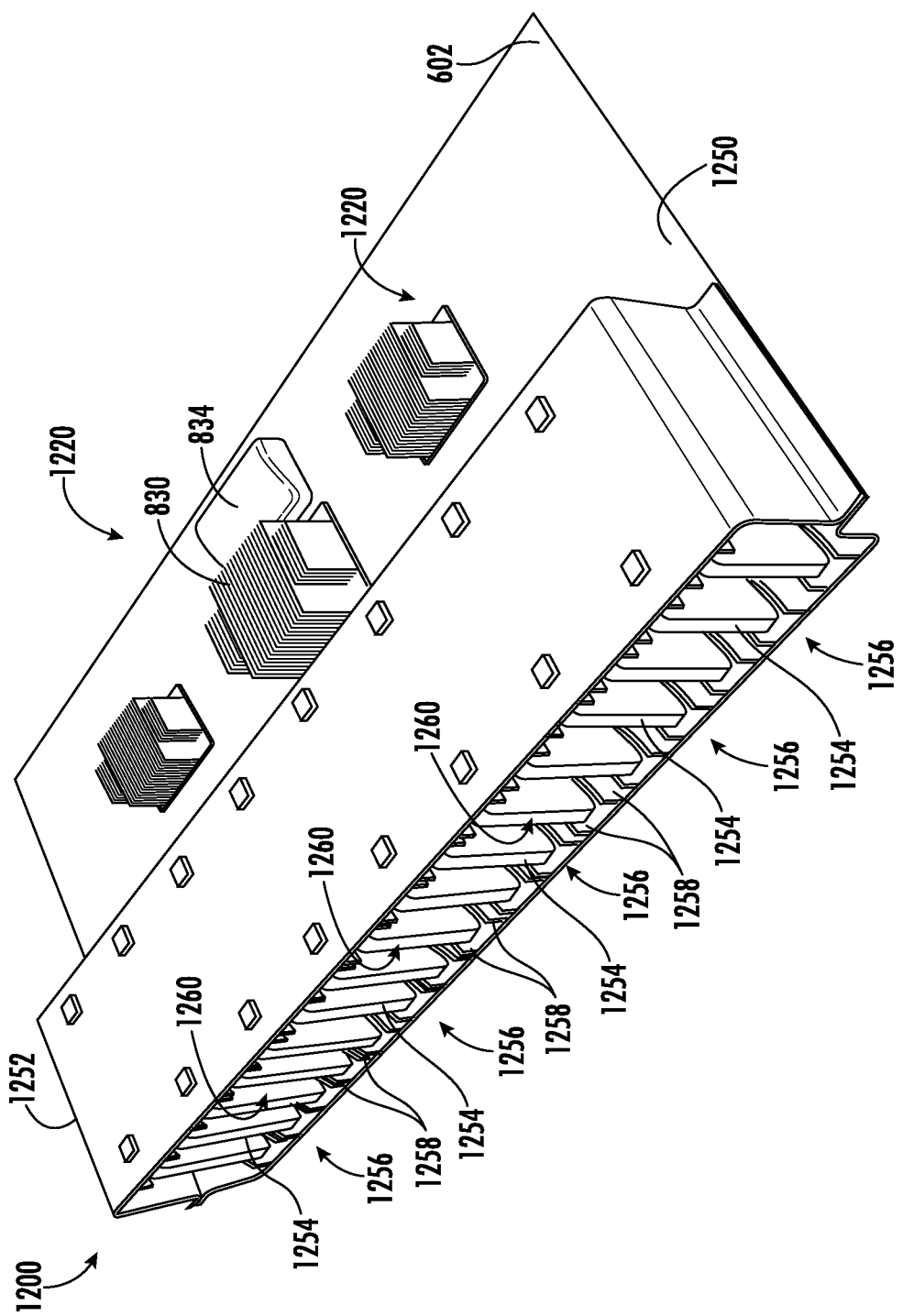
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
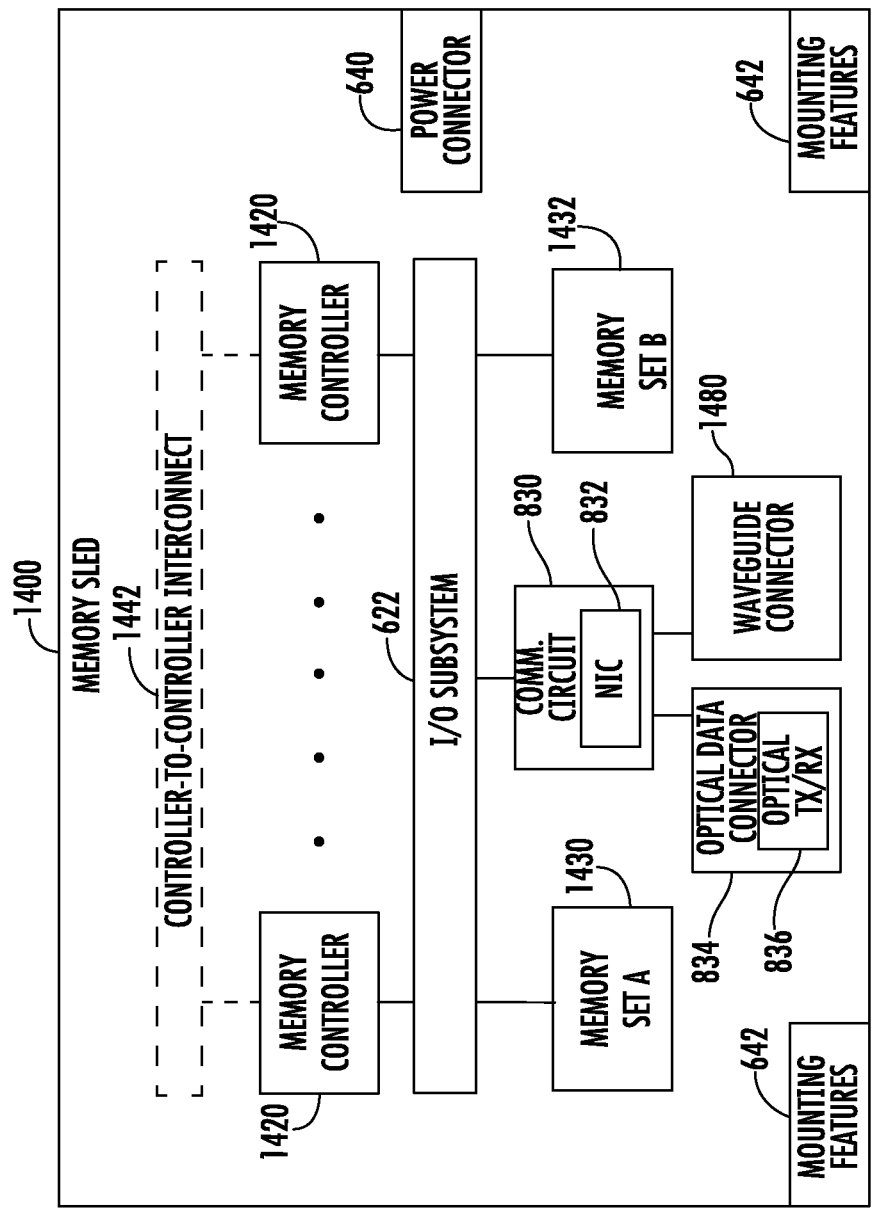
FIG. 14 is a simplified block diagram of at least one embodiment of a memory sled usable in the data center of FIG. 1.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Tx (i.e., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
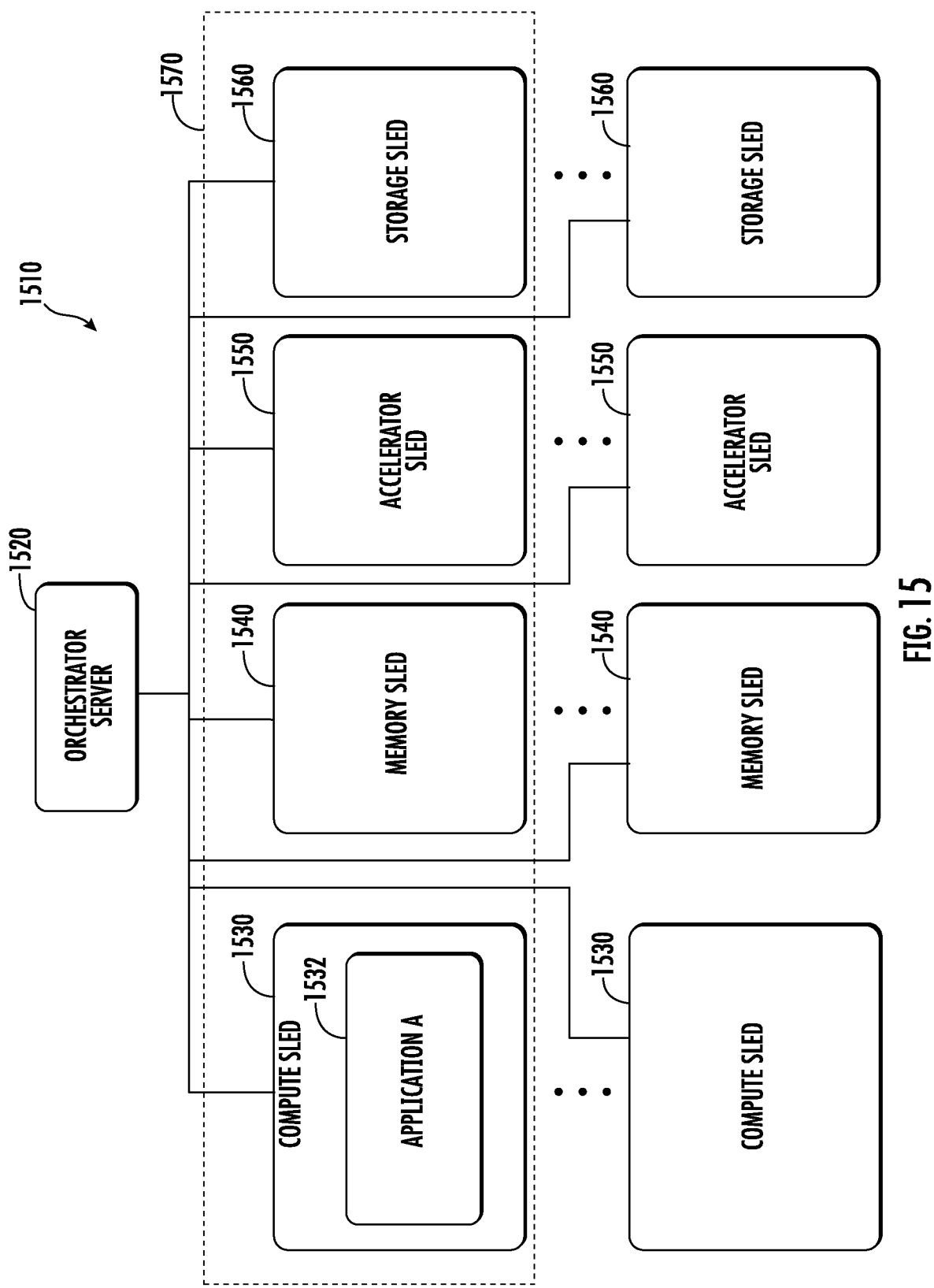
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
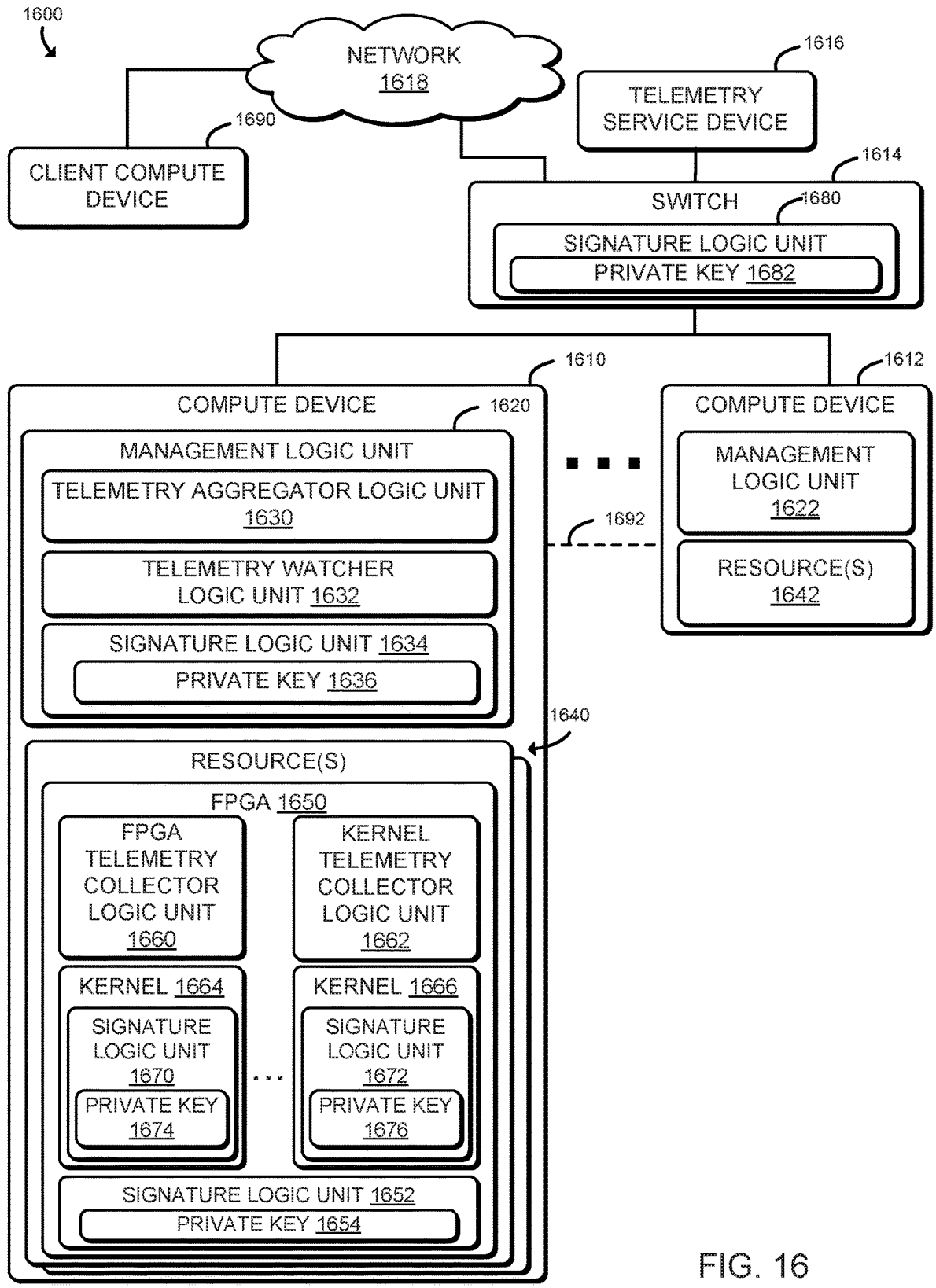
FIG. 16 is a simplified diagram of at least one embodiment of a system for providing certified telemetry data from resources in a distributed architecture.

Referring now to FIG. 16, a system 1600 for providing certified telemetry from devices in a distributed architecture includes multiple compute devices 1610, 1612 in communication with a telemetry service device 1616 through a switch 1614. The system 1600, in some embodiments, may have an architecture similar to the system 1510 of FIG. 15, in which the compute devices described herein are embodied as sleds 400 (e.g., compute sleds 800, accelerator sleds 1000, memory sleds 1400, etc.). Additionally, a client compute device 1690 (e.g., a consumer compute device at the edge, a compute device of a service provider or other party paying for usage of resources in the compute devices 1610, 1612 under an agreement, such as a service level agreement, etc.) is in communication with the telemetry service device 1616 and the compute devices 1610, 1612 through a network 1618. In operation, the system 1600 provides a mechanism and trustable arrangement to validate that all telemetry data (e.g., data indicative of the utilization of each resource in the system 1600) is certified (e.g., signed with a private key, which may be registered by a manufacturer of the resource producing the telemetry data, and may be immutable or modifiable only by the manufacturer) by each corresponding compute device 1610, 1612 utilizing that resource. As such, a tenant (e.g., a party paying for usage of resources in the system 1600 according to a service level agreement) can validate that any telemetry data reported to that tenant (e.g., by the telemetry service device 1616) is correct (e.g., is not overstated) and ensure that any corresponding billing for the usage of those resources is accurate.

In the illustrative embodiment, the compute device 1610 includes a management logic unit 1620 and a set of resources 1640. The compute device 1612 also includes a management logic unit 1622 and a set of resources 1642. The management logic unit 1620, may be embodied as a baseboard management controller (BMC) or other set of devices or circuitry configured to perform management functions for the compute device 1610, and in the illustrative embodiment, includes a telemetry aggregator logic unit 1630, a telemetry watcher logic unit 1632, and a signature logic unit 1634. The telemetry aggregator logic unit 1630 may be embodied as any device or circuitry (e.g., a processor, dedicated circuitry, etc.) configured to aggregate telemetry data (e.g., any data indicative of the utilization of one or more corresponding resources) from resources of the compute device 1610 (e.g., the resources 1640) and/or resources elsewhere in the system 1600 (e.g., one or more resources 1642 of the compute device 1612 or of another device (not shown), which may report their corresponding telemetry data to the telemetry aggregator logic unit 1630 of the compute device 1610). The telemetry watcher logic unit 1632 may be embodied as any device or circuitry (e.g., a processor, dedicated circuitry, etc.) configured to obtain telemetry data from the resources 1640 of the compute device 1610 (e.g., prior to providing that telemetry data to the telemetry aggregator logic unit 1630), such as by reading one or more memory locations where each resource writes its corresponding telemetry data. The signature logic unit 1634 may be embodied as any device or circuitry capable of signing (e.g., certifying) obtained telemetry data (e.g., from the resources 1640, 1642) with a private key 1636 (e.g., a cryptographic code unique to the signature logic unit 1634 of the compute device 1610). As stated above, the signature logic unit 1634 may be included in a baseboard management controller (BMC) of each sled. To sign (e.g., certify) a set of telemetry data, the signature logic unit 1634 may generate a hash of the telemetry data and encrypt the hash using the private key 1636. As such, for another device (e.g., a validating device) to validate that the telemetry data was signed (e.g., certified) by the signature logic unit 1634 (e.g., by a baseboard management controller (BMC) of the corresponding sled) and not tampered with or otherwise fabricated, the validating device may decrypt the hash using a public key uniquely associated with the signature logic unit 1634 to determine whether the decrypted hash accurately represents the corresponding telemetry data. If not, the validating device may determine that the telemetry data was tampered with or fabricated (e.g., not representative of the actual utilization of the resources associated with the telemetry data). In some embodiments, the signature logic unit 1634 (e.g., in a baseboard management controller (BMC) of the corresponding sled) may perform the validation process described above on received telemetry data that was allegedly signed by another signature logic unit (e.g., by another sled's baseboard management controller (BMC)) in the system 1600.

The resources 1640, which are described in more detail with reference to FIG. 17, may be embodied as any devices or circuitry (e.g., processor(s), memory, communication circuitry, data storage devices, accelerator devices, etc.) capable of assisting in the execution of a workload (e.g., a set of operations, an application, etc.) on behalf of a customer (e.g., a tenant of the system). In some embodiments, multiple resources may be pooled (e.g., logically grouped together) from different compute devices 1610, 1612 in the system 1600 to assist in the execution of the same workload. In the illustrative embodiment, an accelerator device, and specifically a field programmable gate array (FPGA) 1650 is included in the resources 1640 of the compute device 1610. The FPGA 1650 includes an FPGA telemetry collector logic unit 1660, which may be embodied as any device or circuitry configured to obtain telemetry data indicative of the usage of the underlying hardware of the FPGA (e.g., a number of logic gates presently being used by one or more workloads, an amount of memory of the FPGA presently being used, etc.). The FPGA 1650, in the illustrative embodiment, also includes a kernel telemetry collector logic unit 1662, which may be embodied as any device or circuitry configured to obtain telemetry data indicative of the utilization (e.g., operations per second, latency, throughput, etc.) of each of one or more kernels (e.g., the kernels 1664, 1666) of the FPGA 1650. Each kernel 1664, 1666 may be embodied as a set of logic gates of the FPGA 1650 that have been configured pursuant to a bit stream (e.g., code indicating a configuration of logic gates to implement a set of functions for a workload). In the illustrative embodiment, each kernel 1664, 1666 includes a signature logic unit 1670, 1672, which has a corresponding private key 1674, 1676. Each signature logic unit 1670, 1672 is configured to sign (e.g., certify) telemetry data associated with the corresponding kernel using operations similar to those described above with reference to the signature logic unit 1634.

In the illustrative embodiment, the FPGA 1650 also includes an FPGA-wide signature logic unit 1652 which has a corresponding private key 1654. The signature logic unit 1652, in the illustrative embodiment, is configured to validate the telemetry data produced and signed by the signature logic units 1670, 1672 of the kernels 1664, 1666, and, afterwards, sign that telemetry data using the private key 1654 prior to sending the telemetry data to the signature logic unit 1634. As such, within the compute device 1610, multiple levels of signing and validation of telemetry data may occur before that telemetry data is provided to the telemetry service device 1616, which may then provide the telemetry data to the client compute device 1690 or otherwise use the telemetry data for resource management and billing operations. While only the FPGA 1650 is shown in the resources 1640 in FIG. 16, it should be understood that the resources 1640 include other devices and circuitry that also contribute to the execution of a workload and produce corresponding telemetry data. Further, the management logic unit 1622 and the resources 1642, of the compute device 1612 may include similar components and perform similar operations to those described with respect to the compute device 1610. However, in some embodiments, one compute device 1610 may have a different number or type of resources 1640 than the compute device 1612 (e.g., the compute device 1610 may include multiple accelerator devices, such as FPGAs, while the compute device 1612 has fewer or no accelerator devices, but includes more general purpose processor capacity (e.g., more processors, more cores, etc.), more memory, more data storage capacity, etc.). Further, the switch 1614, in the illustrative embodiment, includes a signature logic unit 1680 with a corresponding private key 1682. In the illustrative embodiment, the signature logic unit 1680 validates and signs any telemetry data provided by the compute devices 1610, 1612 prior to sending that telemetry data to the telemetry service device 1616. As such, compared to other systems that may produce data indicative of the utilization of various resources of a data center (e.g., for billing and/or load balancing purposes), the system 1600 provides certification (e.g., signing) of the telemetry data at multiple levels to reduce the opportunity for manipulating the telemetry data to represent that one or more resources were used more or less than they actually were used. In the illustrative embodiment, the resources 1640, 1642 in the system 1600 are discrete resources that are connected to each other by a separate platform fabric 1692 (e.g., peripheral component interconnect express (PCIe), etc.).

Figure 17:
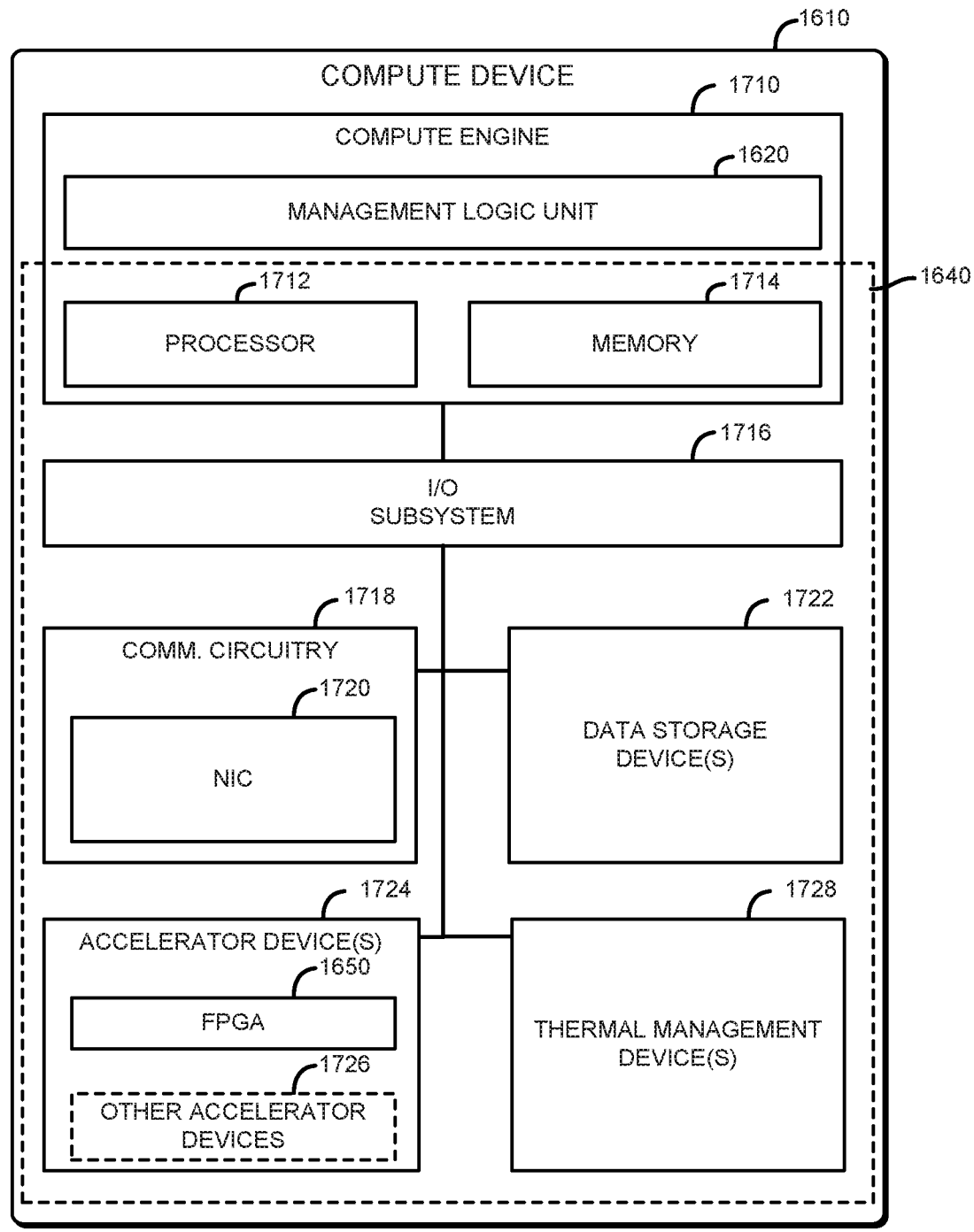
FIG. 17 is a simplified block diagram of at least one embodiment of a compute device included in the system of FIG. 16.
Figure 18:
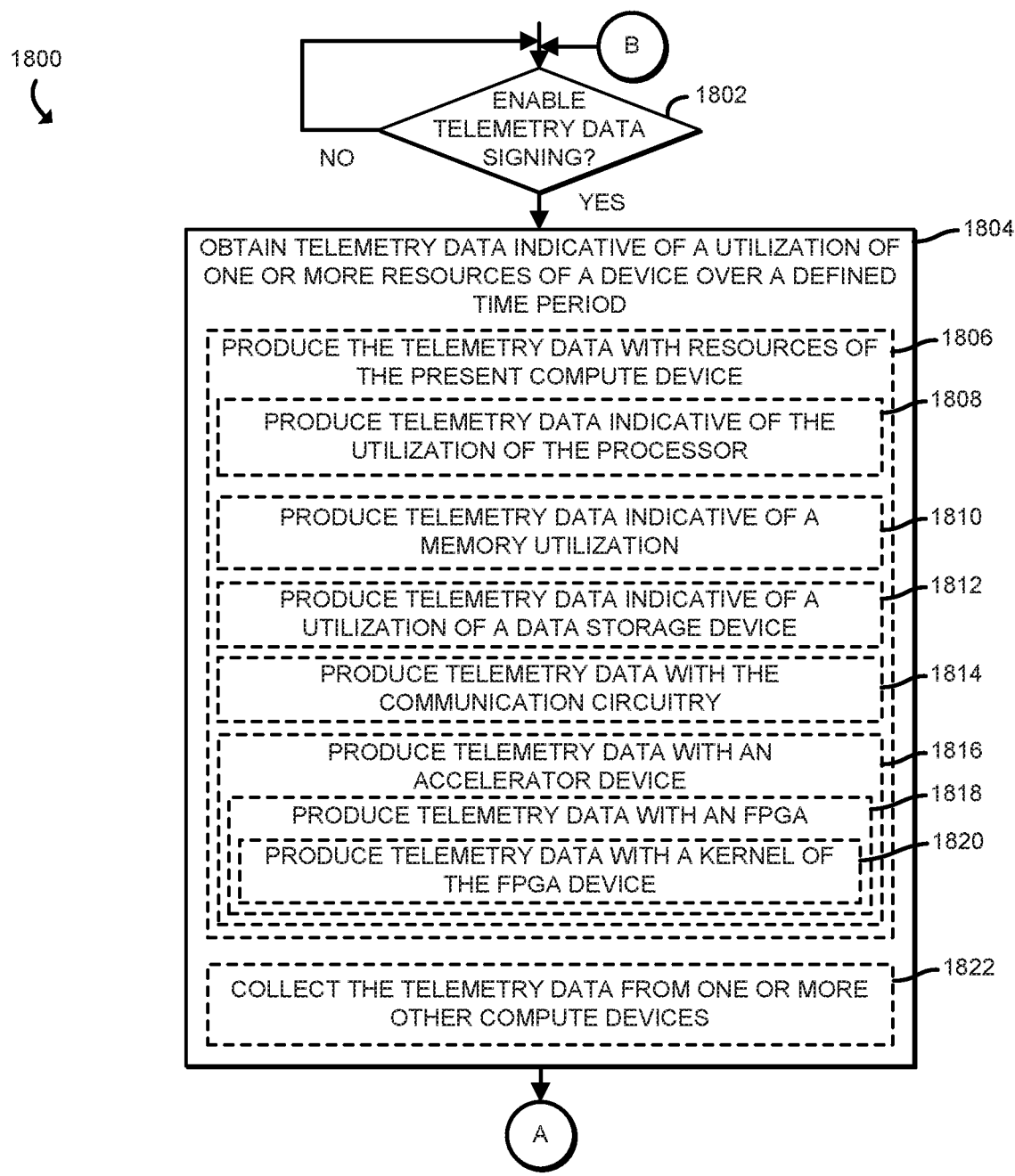
FIGS. 18-19 are a simplified block diagram of at least one embodiment of a method for providing certified telemetry data that may be performed by a device of the system of FIG. 16.

Referring now to FIG. 17, the illustrative compute device 1610 includes a compute engine (also referred to herein as "compute engine circuitry") 1710, an input/output (I/O) subsystem 1716, communication circuitry 1718, one or more data storage devices 1722, one or more accelerator devices 1724, and one or more thermal management devices 1728.

Of course, in other embodiments, the compute device 1610 may include other or additional components, such as those commonly found in a computer (e.g., a display, peripheral devices, etc.). Additionally, in some embodiments, one or more of the illustrative components may be incorporated in, or otherwise form a portion of, another component. The compute engine 1710 may be embodied as any type of device or collection of devices capable of performing various compute functions described below. In some embodiments, the compute engine 1710 may be embodied as a single device such as an integrated circuit, an embedded system, a field-programmable gate array (FPGA), a system-on-a-chip (SOC), or other integrated system or device. In the illustrative embodiment, the compute engine 1710 includes or is embodied as the management logic unit 1620, a processor 1712, and a memory 1714. The processor 1712 may be embodied as any type of processor capable of performing the functions described herein. For example, the processor 1712 may be embodied as a multi-core processor (s), a microcontroller, or other processor or processing/controlling circuit. In some embodiments, the processor 1712 may be embodied as, include, or be coupled to an FPGA, an application specific integrated circuit (ASIC), reconfigurable hardware or hardware circuitry, or other specialized hardware to facilitate performance of the functions described herein.

The main memory 1714 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 1714 may be integrated into the processor 1712. In operation, the main memory 1714 may store various software and data used during operation such as applications, libraries, and drivers.

The compute engine 1710 is communicatively coupled to other components of the compute device 1610 via the I/O subsystem 1716, which may be embodied as circuitry and/or components to facilitate input/output operations with the compute engine 1710 (e.g., with the processor 1712, the main memory 1714, and the management logic unit 1620) and other components of the compute device 1610. For example, the I/O subsystem 1716 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1716 may form a portion of a system-on-a-chip (SoC) and be incorporated, along with one or more of the processor 1712, the main memory 1714, and other components of the compute device 1610, into the compute engine 1710.

The communication circuitry 1718 may be embodied as any communication circuit, device, or collection thereof, capable of enabling communications over the network 1618 between the compute device 1610 and another compute device (e.g., the compute device 1612, the switch 1614, the telemetry service device 1616, the client compute device 1690, etc.). The communication circuitry 1718 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1718 includes a network interface controller (NIC) 1720, which may also be referred to as a host fabric interface (HFI). The NIC 1720 may be embodied as one or more add-in-boards, daughter cards, network interface cards, controller chips, chipsets, or other devices that may be used by the compute device 1610 to connect with another compute device (e.g., the compute device 1612, the switch 1614, the telemetry service device 1616, the client compute device 1690, etc.). In some embodiments, the NIC 1720 may be embodied as part of a system-on-a-chip (SoC) that includes one or more processors, or included on a multichip package that also contains one or more processors. In some embodiments, the NIC 1720 may include a local processor (not shown) and/or a local memory (not shown) that are both local to the NIC 1720. In such embodiments, the local processor of the NIC 1720 may be capable of performing one or more of the functions of the compute engine 1710 described herein. Additionally or alternatively, in such embodiments, the local memory of the NIC 1720 may be integrated into one or more components of the compute device 1610 at the board level, socket level, chip level, and/or other levels.

Each data storage device 1722, may be embodied as any type of device configured for short-term or long-term storage of data such as, for example, memory devices and circuits, memory cards, hard disk drives, solid-state drives, or other data storage device. Each data storage device 1722 may include a system partition that stores data and firmware code for the data storage device 1722 and one or more operating system partitions that store data files and executables for operating systems.

Each accelerator device 1724 may be embodied as any device or circuitry (e.g., the FPGA 1650, and/or other devices 1726 such as another FPGA, an application specific integrated circuit (ASIC), a graphics processing unit (GPU), a coprocessor, etc.) configured to execute a set of operations faster than the processor 1712. The compute device 1610, in the illustrative embodiment, also includes one or more thermal management devices 1728, each of which may be embodied as any device or circuitry (e.g., a temperature sensor, a fan, a pump, etc.) configured to monitor a temperature of one or more components or areas within the compute device 1610 and facilitate a heat transfer operation to maintain the temperature within a particular range. As shown in FIG. 17, the processor 1712, the memory 1714, the I/O subsystem 1716, the communication circuitry 1718, the data storage devices 1722, the accelerator devices 1724, and the thermal management devices 1728 constitute resources 1640 of the compute device 1610 ("device resources") and, in the illustrative embodiment, produce telemetry data indicative of a utilization of each corresponding resource (e.g., a number of operations per second performed by the processor 1712, a present memory bandwidth utilization, a present number of I/O operations per second, an amount of communication capacity presently being used, an amount of data storage capacity being used, a number of operations per second performed by each accelerator device 1724, a sensed temperature, fan speed, or volumetric flow rate associated with a thermal management device 1728, etc.). While shown as a single unit, it should be understood that the resources 140 of the compute device 1610 may be distributed across multiple locations (e.g., across a data center), rather than being housed in a single enclosure.

The compute device 1612, the telemetry service device 1616, the switch 1614, and the client compute device 1690 may have components similar to those described in FIG. 17 with reference to the compute device 1610. The description of those components of the compute device 1610 is equally applicable to the description of components of the compute device 1612, the telemetry service device 1616, the switch 1614, and the client compute device 1690, with the exception that, in some embodiments, the client compute device 1690 does not include the management logic unit 1620. Further, it should be appreciated that any of compute devices 1610, 1612, the telemetry service device 1616, the switch 1614, and the client compute device 1690 may include other components, sub-components, and devices commonly found in a computing device, which are not discussed above in reference to the compute device 1610 and not discussed herein for clarity of the description.

As described above, the compute devices 1610, 1612, the switch 1614, the telemetry service device 1616, and the client compute device 1690 are illustratively in communication via the network 1618, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), a radio area network (RAN), digital subscriber line (DSL) networks, cable networks (e.g., coaxial networks, fiber networks, etc.), or any combination thereof.

Referring now to FIG. 17, the compute device 1610, in operation, may execute a method 1800 for providing certified (e.g., signed) telemetry data. While the method 1800 is described primarily with reference to the compute device 1610 performing the operations, it should be understood that the method 1800, in the illustrative embodiment, is also performed by the compute device 1612 and the switch 1614. The method 1800 begins with block 1802, in which the compute device 1610 determines whether to enable signing of telemetry data. In making the determination, the compute device 1610 may determine whether the compute device 1610 is equipped with the signature logic unit 1634 (e.g., within the management logic unit 1620). Additionally or alternatively, the compute device 1610 may determine whether a configuration setting (e.g., in a configuration file stored in the data storage device 1722) indicates to enable signing of telemetry data. In other embodiments, the compute device 1610 may make the determination based on other or additional factors. Regardless, in response to a determination to enable signing of telemetry data, the method 1800 advances to block 1804 in which the compute device 1610 obtains telemetry data indicative of a utilization of one or more resources of a device (e.g., of the compute device 1610, of another device, such as the compute device 1612, etc.) over a defined time period (e.g., operations per second measurements associated with corresponding time stamps indicative of times at which each operations per second measurement was taken, temperatures associated with corresponding time stamps, etc.).

In doing so, in the illustrative embodiment, the compute device 1610 produces the telemetry data with resources of the present compute device (e.g., the resources 1640), as indicated in block 1806. For example, and as indicated in block 1808, the compute device 1610 may produce telemetry data indicative of the utilization of the processor 1712 (e.g., a number of operations per second). Additionally or alternatively, the compute device 1610 may produce telemetry data indicative of the utilization of the memory 1714 (e.g., reads and/or writes per second, a bandwidth of the memory presently being utilized, etc.), as indicated in block 1810. Further, the compute device 1610 may produce telemetry data indicative of the present utilization of one or more data storage devices 1722 (e.g., reads and/or writes per second, a capacity of the data storage device presently utilized by one or more workloads, etc.), as indicated in block 1812. As indicated in block 1814, the compute device 1610 may produce telemetry data with the communication circuitry 1718 (e.g., the communication capacity of the NIC 1720 that is presently being utilized). In block 1816, the compute device 1610 may produce telemetry data with an accelerator device 1724 of the compute device 1610. For example, and as indicated in block 1818, the compute device 1610 may produce telemetry data with an FPGA (e.g., the FPGA 1650). Further, and as indicated in block 1820, the compute device 1610 may produce telemetry data with a specific kernel of the FPGA 1650 (e.g., the kernel 1664 and/or the kernel 1666). The compute device 1610 may additionally collect telemetry data from one or more other compute devices (e.g., telemetry data produced by one or more resources 1642 of the compute device 1612, such as accelerator devices that have been pooled with the accelerator device(s) 1724 of the compute device 1610 to cooperatively execute a workload), as indicated in block 1822.

Subsequently, the method 1800 advances to block 1824 of FIG. 19, in which the compute device 1610 signs the telemetry data obtained in block 1824. In some embodiments, the particular sets of telemetry data that are to be signed may be defined by an application (e.g., workload) executed on behalf of a tenant (e.g., the application may indicated that telemetry data produced by accelerator devices are to be signed and telemetry data produced by memory devices need not be signed).

Figure 19:
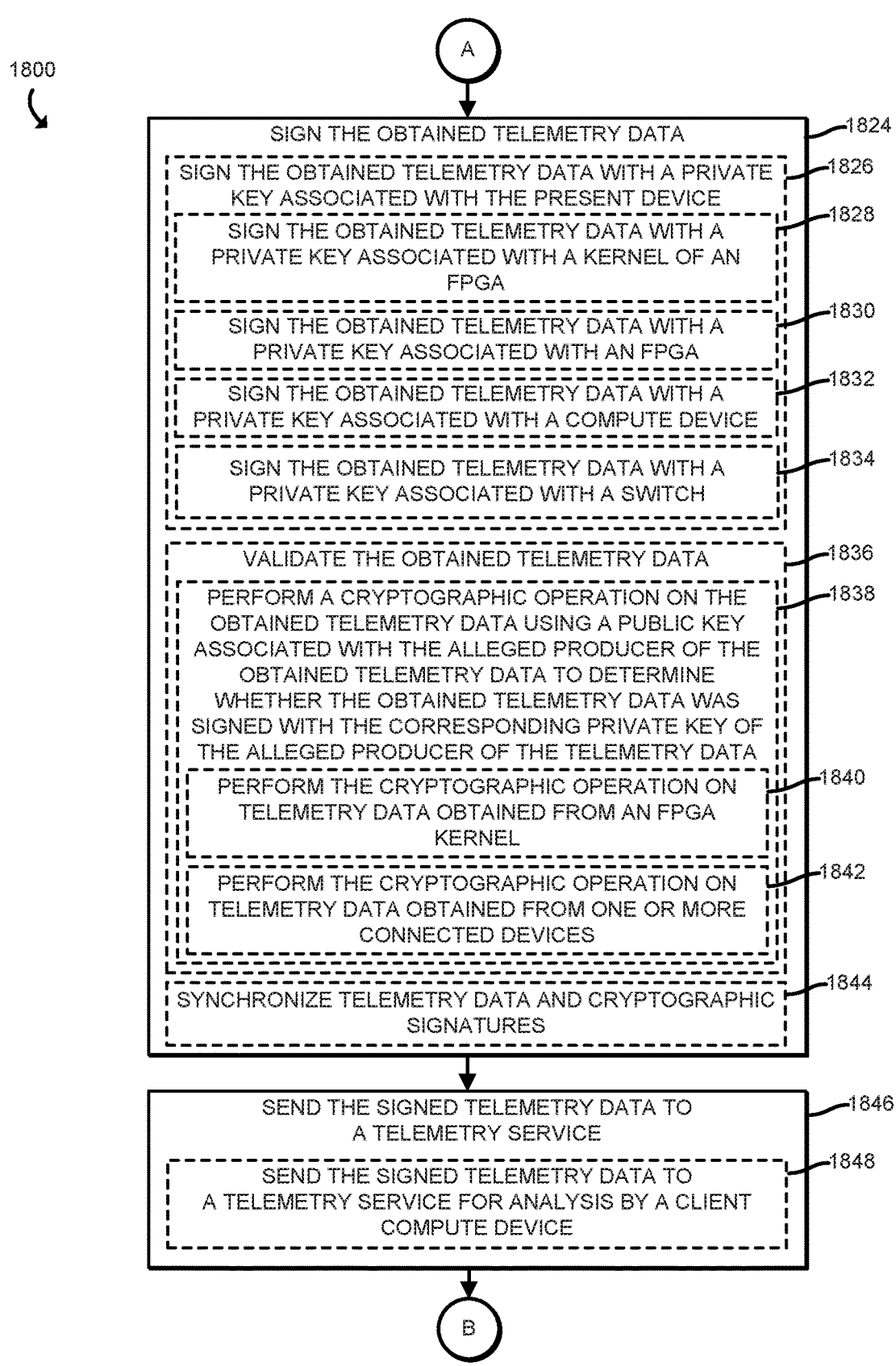

Referring now to FIG. 19, in the illustrative embodiment, the compute device 1610 may sign the obtained telemetry data with a private key associated with the present device (e.g., with the private key 1636 of the compute device 1610), as indicated in block 1826. In doing so, the compute device 1610 may sign the obtained telemetry data with a private key associated with a kernel of an FPGA (e.g., the kernel 1664 may sign, with the private key 1674, telemetry data produced by the kernel 1664), as indicated in block 1828. As indicated in block 1830, the compute device 1610 may sign the obtained telemetry data with a private key associated with an FPGA (e.g., the signature logic unit 1652 may sign, with the private key 1654, telemetry data that was produced by a kernel 1664, 1666 and signed with the corresponding private key 1674, 1676 of the kernel 1664, 1666).

As indicated in block 1832, the compute device 1610, in the illustrative embodiment, signs the telemetry data with the private key of the compute device 1610 (e.g., with the private key 1636). As indicated in block 1834, the telemetry data may be signed with a private key associated with a switch (e.g., if the switch 1614 is performing the method 1800). In block 1836, the compute device 1610, in the illustrative embodiment, may validate the obtained telemetry data. For example, and as indicated in block 1838, the compute device 1610 may perform a cryptographic operation on the obtained telemetry data using a public key associated with the alleged producer (e.g., the resource 1640 whose utilization is indicated in the telemetry data) of the obtained telemetry data to determine whether the obtained telemetry data was signed with the corresponding private key of the alleged producer of the telemetry data. In doing so, and as indicated in block 1840, the compute device 1610 may perform the cryptographic operation on telemetry data obtained from a kernel of an FPGA (e.g., the signature logic unit 1652 of the FPGA 1650 may perform a cryptographic operation on telemetry data that was produced by the kernel 1664 and signed with the private key 1674 of the kernel 1664, prior to signing the telemetry data with the private key 1654, and the signature logic unit 1634 may perform a similar validation operation on the telemetry data signed by the FPGA 1650 prior to signing that telemetry data with the private key 1636).

In block 1842, the compute device 1610, in the illustrative embodiment, performs the cryptographic operation on telemetry data obtained from one or more devices connected to the compute device 1610 (e.g., one or more resources 1642 of the compute device 1612 or of another compute device (not shown) that are performing operations to cooperatively execute a workload with resources 1640 of the compute device 1610) to validate that the telemetry data obtained from those devices were in fact produced by (e.g., and signed with the private keys of) those devices (e.g., the private key of the compute device 1612, the private keys of any FPGAs and kernels of those FPGAs of the compute device 1612, etc.). In some embodiments, the processor 1712 may generate an interrupt to an application (e.g., the application for which the resources 1640, 1642 are performing operations) if certified telemetry data from a resource 1640, 1642 is not valid. As indicated in block 1844, the compute device 1610 may synchronize obtained telemetry data and the corresponding cryptographic signatures (e.g., device signatures) associated with the telemetry data. Subsequently, in block 1846, the compute device 1610 sends the signed telemetry data to a telemetry service (e.g., to the telemetry service device 1616). In doing so and as indicated in block 1848, the compute device 1610 sends the signed telemetry data to a telemetry service for analysis by a client compute device (e.g., the client compute device 1690, which may be a compute device of a party who has paid for utilization of one or more resources of the system 1600).

Figure 20:
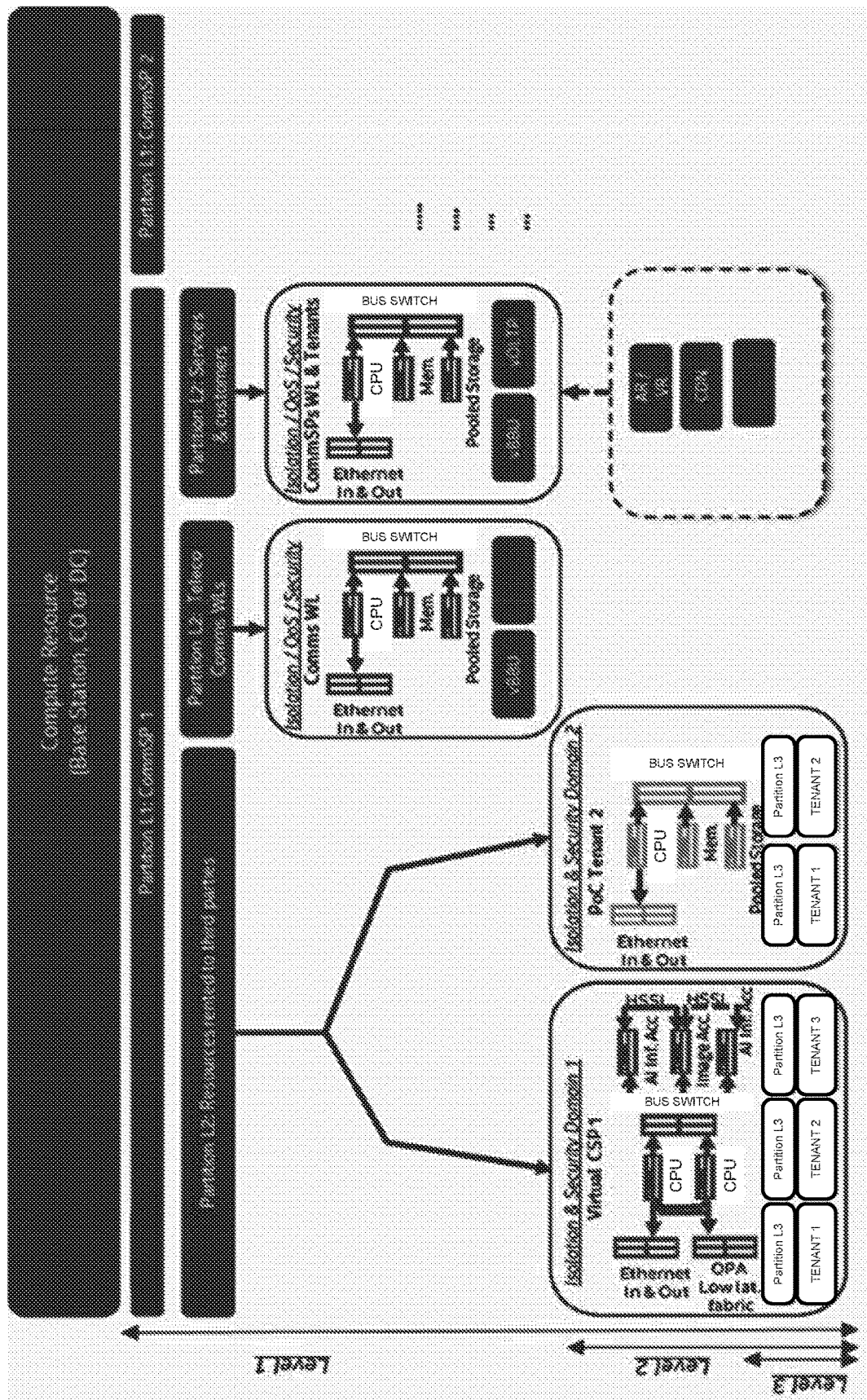
FIG. 20 is a simplified diagram of multiple hardware provisioning and service hosting scenarios in which the system of FIG. 16 may operate.

Referring now to FIG. 20, the system 1600 described with reference to FIG. 16 may operate in multiple hardware provisioning and service hosting scenarios to provide certified (e.g., signed) telemetry data to parties who utilize and/or own the infrastructure (e.g., the resources) of the system 1600. In particular, three scales of operations and resource ownerships are shown. Each scale defines how the different parties provision hardware infrastructure and host application services over mixes of pooled resources, and resources assigned for long or short duration exclusive use. The three levels of scale in resource partitioning are identified in FIG. 20 as levels 1, 2, and 3, and are described below.

In one scenario, an operator, A, owns the end to end infrastructure, including all the networking and compute resources of an edge data center. In this scenario, the operator, A, uses its own platforms to run its own services, and at the same time, may rent surplus capacity (e.g., platforms, space, power-and-cooling, etc) to other parties (e.g., B, C, etc.), and A may have service level agreements (SLAs) and meterings over such infrastructures. This option is very attractive from the operator's perspective. However, the service providers may have concerns regarding: (1) security, (2) privacy, (3) quality of service (QoS), (4) intellectual property (IP) protection with respect to A and the other co-tenants. In this arrangement, as depicted in FIG. 20, three further levels of resource renting can occur, as follows. Some of the parties that A rents out the infrastructure to may be operators as well (e.g., similar to the operator A). This model is common in countries where A is usually a major tier-1 operator, and others to whom A rents out surplus capacity, are smaller operators. At either the primary operator (e.g. A)'s level, or at a sub-operator's level, the available resource partitions may be divided into at least three subgroups: (a) partitions carved out for renting or for transfer to third party service providers; (b) those set aside for an operator's dedicated usage, for example, for network functions (e.g., virtual broadband network gateway (vBNG), virtual evolved packet core (vEPC), etc.); and (c) those for hosting various services that the operator provides to its own customers. Any partition that a service provider may obtain (in a, above), referred to also as a level 2 partition in FIG. 20, may be offered by that entity for renting/leasing to other service providers who may wish to co-locate their edge services for low latency usages near the edge and into flows with their partner services. Each of these partitions is managed and virtually owned by the service provider at this level (level 2), even if it was originally rented from an original operator or owner.

An operator, such as A, may own the end-to-end networking infrastructure and data center infrastructure along with all computation resources that it needs for deploying its own network functions and services. Each other service provider may rent its own space in an edge location (e.g., a base station, a central office, etc.) and deploy its own compute solution(s) there. In this scenario, A facilitates access to its edge infrastructure that other service providers may need, and may deploy on a temporary and metered basis, the use of A's compute, storage, and/or network resources for points-of-presence for those service providers. Additionally or alternatively, each service provider deploys its own services and secures them in infrastructures that it obtains and manages, even if in conjunction with other parties or customers (e.g., as customer premises equipment).

In another model, the service providers are also operators to a significant degree. For example, each service provider may have its own data center that is placed or hosted outside of a communication services operator's ("comm's") infrastructure. In this case, a particular comm's edge location, such as a base station, has a wired direct connection to that particular data center. For example, a media streaming company may directly connect its own content distribution networks (CDNs) into base stations owned by a communication infrastructure owner. This model can be suitable service providers whose scale of operations is large enough for them to perform their own operational expense (OPEX) management.

The significance of the above variations is that they require different levels of collaboration, trust, and, legal and operational arrangements for watching and aggregating telemetry data, particularly, telemetry data for any shared resources such as pools of storage, memory, switches, accelerator devices, or other resources and making the telemetry data available to each party for use in that party's own reactive, proactive, and/or predictive strategies. Parties may also use telemetry data for charge metering and settling outstanding payments. For such federated use of information at many different levels of granularity and for instituting appropriate resource or data isolations, it is necessary to be able to trust, but verify, the compliance of different parties with the agreements that are the basis of their sharing. As such, by providing certified (e.g., signed) telemetry as described above, the system 1600 provide mechanisms to validate that the telemetry data exposed by (1) any intermediate resource, (2) the compute device(s) where workloads are executed, and/or (3) the discrete or pooled resources that assist in the execution of workloads has not been not modified or manipulated by any of the different data center tenants or operators described above.

EXAMPLES

Illustrative examples of the technologies disclosed herein are provided below. An embodiment of the technologies may include any one or more, and any combination of, the examples described below.

Example 1 includes a device comprising circuitry to obtain telemetry data indicative of a utilization of one or more device resources over a time period; sign the obtained telemetry data with a private key associated with the present device; and send the signed telemetry data to a telemetry service for analysis.

Example 2 includes the subject matter of Example 1, and wherein to produce the telemetry data comprises to produce telemetry data indicative of the utilization of a processor of the present device.

Example 3 includes the subject matter of any of Examples 1 and 2, and wherein to produce the telemetry data comprises to produce telemetry data indicative of the utilization of a memory of the present device.

Example 4 includes the subject matter of any of Examples 1-3, and wherein to produce the telemetry data comprises to produce telemetry data indicative of the utilization of a data storage device of the present device.

Example 5 includes the subject matter of any of Examples 1-4, and wherein to produce the telemetry data comprises to produce telemetry data indicative of the utilization of communication circuitry of the present device.

Example 6 includes the subject matter of any of Examples 1-5, and wherein to produce the telemetry data comprises to produce telemetry data with an accelerator device of the present device.

Example 7 includes the subject matter of any of Examples 1-6, and wherein to produce the telemetry data comprises to produce the telemetry data with a field programmable gate array (FPGA) of the present device.

Example 8 includes the subject matter of any of Examples 1-7, and wherein to produce the telemetry data comprises to produce the telemetry with a kernel of the FPGA.

Example 9 includes the subject matter of any of Examples 1-8, and wherein to obtain the telemetry data comprises to collect the telemetry data from one or more compute devices in communication with the present device.

Example 10 includes the subject matter of any of Examples 1-9, and wherein to sign the obtained telemetry data comprises to sign the telemetry data with a private key of a kernel of a field programmable gate array (FPGA) of the present device.

Example 11 includes the subject matter of any of Examples 1-10, and wherein the circuitry is further to validate the telemetry data signed with the private key of the kernel of the FPGA and sign, in response to a determination that telemetry data has been signed with the private key of the kernel, the telemetry data with a private key of the FPGA.

Example 12 includes the subject matter of any of Examples 1-11, and wherein to sign the obtained telemetry data comprises to validate that the telemetry data has been signed with a first private key associated with a corresponding compute device; and sign, in response to a determination that the telemetry data has been signed with the first private key associated with the corresponding compute device, the telemetry data with a private key associated with the present device.

Example 13 includes the subject matter of any of Examples 1-12, and wherein the circuitry is further to synchronize the telemetry data with one or more cryptographic signatures.

Example 14 includes the subject matter of any of Examples 1-13, and wherein to sign the obtained telemetry data comprises to sign the telemetry data with a baseboard management controller.

Example 15 includes one or more machine-readable storage media comprising a plurality of instructions stored thereon that, in response to being executed, cause a device to obtain telemetry data indicative of a utilization of one or more device resources over a time period; sign the obtained telemetry data with a private key associated with the present device; and send the signed telemetry data to a telemetry service for analysis.

Example 16 includes the subject matter of Example 15, and wherein to produce the telemetry data comprises to produce telemetry data indicative of the utilization of a processor, a memory, a data storage device, communication circuitry, or an accelerator device of the present device.

Example 17 includes the subject matter of any of Examples 15 and 16, and wherein to produce the telemetry data comprises to produce the telemetry data with a field programmable gate array (FPGA) of the present device.

Example 18 includes the subject matter of any of Examples 15-17, and wherein to produce the telemetry data comprises to produce the telemetry with a kernel of the FPGA.

Example 19 includes the subject matter of any of Examples 15-18, and wherein to obtain the telemetry data comprises to collect the telemetry data from one or more compute devices in communication with the present device.

Example 20 includes a method comprising obtaining, by a compute device, telemetry data indicative of a utilization of one or more device resources over a time period; signing, by the compute device, the obtained telemetry data with a private key associated with the compute device; and sending, by the compute device, the signed telemetry data to a telemetry service for analysis.

The invention claimed is:

1. An accelerator device comprising:
circuitry to:
obtain encrypted telemetry data indicative of a utilization of a field programmable gate array (FPGA) while configured to support a kernel over a time period, the obtained encrypted telemetry data encrypted using a private key of the kernel;
decrypt, at the FPGA of the present accelerator device, the encrypted telemetry data via use of a public key of the kernel to validate the telemetry data;
sign the validated telemetry data with a private key of the FPGA; and
cause the signed and validated telemetry data to be sent to a telemetry service for analysis to provide multiple levels of signing of the telemetry data to prevent manipulation of the telemetry data to be analyzed by the telemetry service.

2. The accelerator device of claim 1, comprising the accelerator device coupled with a processor, wherein the circuitry is further to:
obtain encrypted processor telemetry data indicative of a utilization of the processor while the FPGA is configured to support the kernel over the time period, the obtained encrypted processor telemetry data encrypted using a private key of the processor;
decrypt, at the FPGA of the present accelerator device, the encrypted processor telemetry data via use of a public key of the processor to validate the processor telemetry data;
sign the validated processor telemetry data with the private key of the FPGA; and
cause the signed and validated processor telemetry data to be sent to the telemetry service for analysis.

3. The accelerator device of claim 1, comprising the accelerator device coupled with a memory device, wherein the circuitry is further to:
obtain encrypted memory device telemetry data indicative of a utilization of the memory device while the FPGA is configured to support the kernel over the time period, the obtained encrypted memory device telemetry data encrypted using a private key of the memory device;
decrypt, at the FPGA of the present accelerator device, the encrypted memory device telemetry data via use of a public key of the memory device to validate the memory device telemetry data;
sign the validated memory device telemetry data with the private key of the FPGA; and
cause the signed and validated memory device telemetry data to be sent to the telemetry service for analysis.

4. The accelerator device of claim 1, comprising the accelerator device coupled with a data storage device, wherein the circuitry is further to:
  obtain encrypted data storage device telemetry data indicative of a utilization of the data storage device while the FPGA is configured to support the kernel over the time period, the obtained encrypted data storage device telemetry data encrypted using a private key of the data storage device;
  decrypt, at the FPGA of the present accelerator device, the encrypted data storage device telemetry data via use of a public key of the data storage device to validate the data storage device telemetry data;
  sign the validated data storage device telemetry data with the private key of the FPGA; and
  cause the signed and validated data storage device telemetry data to be sent to the telemetry service for analysis.

5. The accelerator device of claim 1, comprising the accelerator device coupled with communication circuitry, wherein the circuitry is further to:
  obtain encrypted communication circuitry telemetry data indicative of a utilization of the communication circuitry while the FPGA is configured to support the kernel over the time period, the obtained encrypted communication circuitry telemetry data encrypted using a private key of the communication circuitry;
  decrypt, at the FPGA of the present accelerator device, the encrypted communication circuitry telemetry data via use of a public key of the communication circuitry to validate the communication circuitry telemetry data;
  sign the validated communication circuitry telemetry data with the private key of the FPGA; and
  cause the signed and validated communication circuitry telemetry data to be sent to the telemetry service for analysis.

6. The accelerator device of claim 1, comprising the accelerator device coupled with a processor, a memory device, a data storage device, and communication circuitry, wherein the circuitry is further to:
  obtain encrypted processor telemetry data indicative of a utilization of the processor while the FPGA is configured to support the kernel over the time period, the obtained encrypted processor telemetry data encrypted using a private key of the processor;
  obtain encrypted memory device telemetry data indicative of a utilization of the memory device while the FPGA is configured to support the kernel over the time period, the obtained encrypted memory device telemetry data encrypted using a private key of the memory device;
  obtain encrypted data storage device telemetry data indicative of a utilization of the data storage device while the FPGA is configured to support the kernel over the time period, the obtained encrypted data storage device telemetry data encrypted using a private key of the data storage device;
  obtain encrypted communication circuitry telemetry data indicative of a utilization of the communication circuitry while the FPGA is configured to support the kernel over the time period, the obtained encrypted communication circuitry telemetry data encrypted using a private key of the communication circuitry;
  decrypt, at the FPGA of the present accelerator device, the encrypted processor, memory device, data storage device and communication circuitry telemetry data via use of a separate public key of the processor, the memory device, the data storage device and the communication circuitry to validate the processor, the memory device, the data storage device and the communication circuitry telemetry data;
  combine the validated processor, memory device, data storage device and communication telemetry data to generate a collected telemetry data;
  sign the collected telemetry data with the private key of the FPGA; and
  cause the signed collected telemetry data to be sent to the telemetry service for analysis.

7. One or more non-transitory machine-readable storage media comprising a plurality of instructions stored thereon that, in response to being executed, cause an accelerator device to:
  obtain encrypted telemetry data indicative of a utilization of a field programmable gate array (FPGA) while configured to support a kernel over a time period, the obtained encrypted telemetry data encrypted using a private key of the kernel;
  decrypt, at the FPGA of the present accelerator device, the encrypted telemetry data via use of a public key of the kernel to validate the telemetry data;
  sign the validated telemetry data with a private key of the FPGA; and
  cause the signed and validated telemetry data to be sent to a telemetry service for analysis to provide multiple levels of signing of the telemetry data to prevent manipulation of the telemetry data to be analyzed by the telemetry service.

8. The one or more non-transitory machine-readable storage media of claim 7, comprising the accelerator device coupled with a processor, a memory device, a data storage device, and communication circuitry wherein the instructions are to further to cause the accelerator device to:
  obtain encrypted processor telemetry data indicative of a utilization of the processor while the FPGA is configured to support the kernel over the time period, the obtained encrypted processor telemetry data encrypted using a private key of the processor;
  obtain encrypted memory device telemetry data indicative of a utilization of the memory device while the FPGA is configured to support the kernel over the time period, the obtained encrypted memory device telemetry data encrypted using a private key of the memory device;
  obtain encrypted data storage device telemetry data indicative of a utilization of the data storage device while the FPGA is configured to support the kernel over the time period, the obtained encrypted data storage device telemetry data encrypted using a private key of the data storage device;
  obtain encrypted communication circuitry telemetry data indicative of a utilization of the communication circuitry while the FPGA is configured to support the kernel over the time period, the obtained encrypted communication circuitry telemetry data encrypted using a private key of the communication circuitry;
  decrypt, at the FPGA of the present accelerator device, the encrypted processor, memory device, data storage device and communication circuitry telemetry data via use of a separate public key of the processor, the memory device, the data storage device and the communication circuitry to validate the processor, the memory device, the data storage device and the communication circuitry telemetry data;
  combine the validated processor, memory device, data storage device and communication telemetry data to generate a collected telemetry data;

sign the collected telemetry data with the private key of the FPGA; and cause the signed collected telemetry data to be sent to the telemetry service for analysis.

9. The one or more non-transitory machine-readable storage media of claim 7, comprising the accelerator device coupled with a processor, wherein the instructions are to further cause the accelerator device to:

obtain encrypted processor telemetry data indicative of a utilization of the processor while the FPGA is configured to support the kernel over the time period, the obtained encrypted processor telemetry data encrypted using a private key of the processor;

decrypt, at the FPGA of the present accelerator device, the encrypted processor telemetry data via use of a public key of the processor to validate the processor telemetry data;

sign the validated processor telemetry data with the private key of the FPGA; and cause the signed and validated processor telemetry data to be sent to the telemetry service for analysis.

10. The one or more non-transitory machine-readable storage media of claim 7, comprising the accelerator device coupled with a memory device, wherein the instructions are to further cause the accelerator device to:

obtain encrypted memory device telemetry data indicative of a utilization of the memory device while the FPGA is configured to support the kernel over the time period, the obtained encrypted memory device telemetry data encrypted using a private key of the memory device;

decrypt, at the FPGA of the present accelerator device, the encrypted memory device telemetry data via use of a public key of the memory device to validate the memory device telemetry data;

sign the validated memory device telemetry data with the private key of the FPGA; and cause the signed and validated memory device telemetry data to be sent to the telemetry service for analysis.

11. The one or more non-transitory machine-readable storage media of claim 7, comprising the accelerator device coupled with a data storage device, wherein the instructions are to further cause the accelerator device to:

obtain encrypted data storage device telemetry data indicative of a utilization of the data storage device while the FPGA is configured to support the kernel over the time period, the obtained encrypted data storage device telemetry data encrypted using a private key of the data storage device;

decrypt, at the FPGA of the present accelerator device, the encrypted data storage device telemetry data via use of a public key of the data storage device to validate the data storage device telemetry data;

sign the validated data storage device telemetry data with the private key of the FPGA; and cause the signed and validated data storage device telemetry data to be sent to the telemetry service for analysis.

12. The one or more non-transitory machine-readable storage media of claim 7, comprising the accelerator device coupled with communication circuitry, wherein the instructions are to further cause the accelerator device to:

obtain encrypted communication circuitry telemetry data indicative of a utilization of the communication circuitry while the FPGA is configured to support the kernel over the time period, the obtained encrypted communication circuitry telemetry data encrypted using a private key of the communication circuitry;

decrypt, at the FPGA of the present accelerator device, the encrypted communication circuitry telemetry data via use of a public key of the communication circuitry to validate the communication circuitry telemetry data;

sign the validated communication circuitry telemetry data with the private key of the FPGA; and cause the signed and validated communication circuitry telemetry data to be sent to the telemetry service for analysis.

13. A method comprising:

obtaining, by an accelerator device, encrypted telemetry data indicative of a utilization of a field programmable gate array (FPGA) while configured to support a kernel over a time period, the obtained encrypted telemetry data encrypted using a private key of the kernel;

decrypting, at the FPGA of the present accelerator device, the encrypted telemetry data via use of a public key of the kernel to validate the telemetry data;

signing the telemetry data with a private key of the FPGA; and causing the signed and validated telemetry data to be sent to a telemetry service for analysis to provide multiple levels of signing of the telemetry data to prevent manipulation of the telemetry data to be analyzed by the telemetry service.

14. The method of claim 13, the accelerator device coupled with a processor, the method further comprising:

obtaining encrypted processor telemetry data indicative of a utilization of the processor while the FPGA is configured to support the kernel over the time period, the obtained encrypted processor telemetry data encrypted using a private key of the processor;

decrypting, at the FPGA of the present accelerator device, the encrypted processor telemetry data via use of a public key of the processor to validate the processor telemetry data;

signing the validated processor telemetry data with the private key of the FPGA; and causing the signed and validated processor telemetry data to be sent to the telemetry service for analysis.

15. The method of claim 13, the accelerator device coupled with a memory device, the method further comprising:

obtaining encrypted memory device telemetry data indicative of a utilization of the memory device while the FPGA is configured to support the kernel over the time period, the obtained encrypted memory device telemetry data encrypted using a private key of the memory device;

decrypting, at the FPGA of the present accelerator device, the encrypted memory device telemetry data via use of a public key of the memory device to validate the memory device telemetry data;

signing the validated memory device telemetry data with the private key of the FPGA; and causing the signed and validated memory device telemetry data to be sent to the telemetry service for analysis.

16. The method of claim 13, the accelerator device coupled with a data storage device, the method further comprising:

obtaining encrypted data storage device telemetry data indicative of a utilization of the data storage device while the FPGA is configured to support the kernel over the time period, the obtained encrypted data storage device telemetry data encrypted using a private key of the data storage device;

decrypting, at the FPGA of the present accelerator device, the encrypted data storage device telemetry data via use of a public key of the data storage device to validate the data storage device telemetry data;

signing the validated data storage device telemetry data with the private key of the FPGA; and causing the signed and validated data storage device telemetry data to be sent to the telemetry service for analysis.

17. The method of claim 13, the accelerator device coupled with communication circuitry, the method further comprising:

obtaining encrypted communication circuitry telemetry data indicative of a utilization of the communication circuitry while the FPGA is configured to support the kernel over the time period, the obtained encrypted communication circuitry telemetry data encrypted using a private key of the communication circuitry;

decrypting, at the FPGA of the present accelerator device, the encrypted communication circuitry telemetry data via use of a public key of the communication circuitry to validate the communication circuitry telemetry data;

signing the validated communication circuitry telemetry data with the private key of the FPGA; and causing the signed and validated communication circuitry telemetry data to be sent to the telemetry service for analysis.

18. The method of claim 13, the accelerator device coupled with a processor, a memory device, a data storage device, and communication circuitry, the method further comprising:

obtaining encrypted processor telemetry data indicative of a utilization of the processor while the FPGA is configured to support the kernel over the time period, the obtained encrypted processor telemetry data encrypted using a private key of the processor;

obtaining encrypted memory device telemetry data indicative of a utilization of the memory device while the FPGA is configured to support the kernel over the time period, the obtained encrypted memory device telemetry data encrypted using a private key of the memory device;

obtaining encrypted data storage device telemetry data indicative of a utilization of the data storage device while the FPGA is configured to support the kernel over the time period, the obtained encrypted data storage device telemetry data encrypted using a private key of the data storage device;

obtaining encrypted communication circuitry telemetry data indicative of a utilization of the communication circuitry while the FPGA is configured to support the kernel over the time period, the obtained encrypted communication circuitry telemetry data encrypted using a private key of the communication circuitry;

decrypting, at the FPGA of the present accelerator device, the encrypted processor, memory device, data storage device and communication circuitry telemetry data via use of a separate public key of the processor, the memory device, the data storage device and the communication circuitry to validate the processor, the memory device, the data storage device and the communication circuitry telemetry data;

combining the validated processor, memory device, data storage device and communication telemetry data to generate a collected telemetry data;

signing the collected telemetry data with the private key of the FPGA; and causing the signed collected telemetry data to be sent to the telemetry service for analysis.

* * * * *